United States Patent [19]

Imafuji et al.

[11] Patent Number: 5,585,875
[45] Date of Patent: Dec. 17, 1996

[54] CAMERA HAVING ANTI-VIBRATION FUNCTION

[75] Inventors: Kazuharu Imafuji; Yoshio Imura, both of Kawasaki, Japan

[73] Assignee: Nikon Corporation, Tokyo, Japan

[21] Appl. No.: 624,203

[22] Filed: Apr. 3, 1996

Related U.S. Application Data

[63] Continuation of Ser. No. 170,888, Dec. 21, 1993, abandoned.

[30] Foreign Application Priority Data

Dec. 22, 1992 [JP] Japan .................................. 4-356425
Dec. 22, 1992 [JP] Japan .................................. 4-356426
Dec. 22, 1992 [JP] Japan .................................. 4-356427

[51] Int. Cl.$^6$ .......................... G03B 39/00; G03B 17/00; H04N 3/06
[52] U.S. Cl. .............................. 396/55; 348/208
[58] Field of Search ............................ 354/70, 202, 430, 354/195.12, 410, 412; 348/208

[56] References Cited

U.S. PATENT DOCUMENTS

| | | | |
|---|---|---|---|
| 4,970,540 | 11/1990 | Vasey et al. ............................. | 354/202 |
| 5,107,293 | 4/1992 | Sekine et al. ............................ | 354/430 |
| 5,117,246 | 5/1992 | Takahashi et al. .................. | 354/430 X |
| 5,153,633 | 10/1992 | Otani ....................................... | 354/430 |
| 5,210,563 | 5/1993 | Hamada et al. ......................... | 354/202 |
| 5,220,375 | 6/1993 | Ishida et al... ......................... | 354/419 |
| 5,237,365 | 8/1993 | Miyazawa .............................. | 354/456 |
| 5,245,378 | 9/1993 | Washisu ............................ | 354/430 X |
| 5,335,032 | 8/1994 | Onuki et al. ......................... | 354/195.1 |
| 5,353,091 | 10/1994 | Ishida et al. ............................ | 354/410 |

*Primary Examiner*—Safet Metjahic
*Assistant Examiner*—Nicholas J. Tuccillo

[57] ABSTRACT

A vibration correction system in a camera which detects vibration of the camera caused, e.g., by a hand tremor, and corrects for the vibration of an image in an image plane caused by vibration of the camera. The vibration correction system includes a vibration sensor which detects vibration of the camera, and a vibration correction optical system which is driven to correct for the detected vibration. When an anomaly occurs in the vibration detection sensor, in the vibration correction optical system, or in the drive system of the vibration correction optical system, the operation of the vibration correction optical system is inhibited. The vibration correction optical system also adjusts for correction error resulting from chatter in a gear mechanism of the drive system of the vibration correction optical system by controlling shutter timing. The vibration correction optical system further adjusts for correction error resulting from a delay in the output of the vibration detection sensor by controlling shutter timing in order to minimize the error caused by the delay.

19 Claims, 15 Drawing Sheets

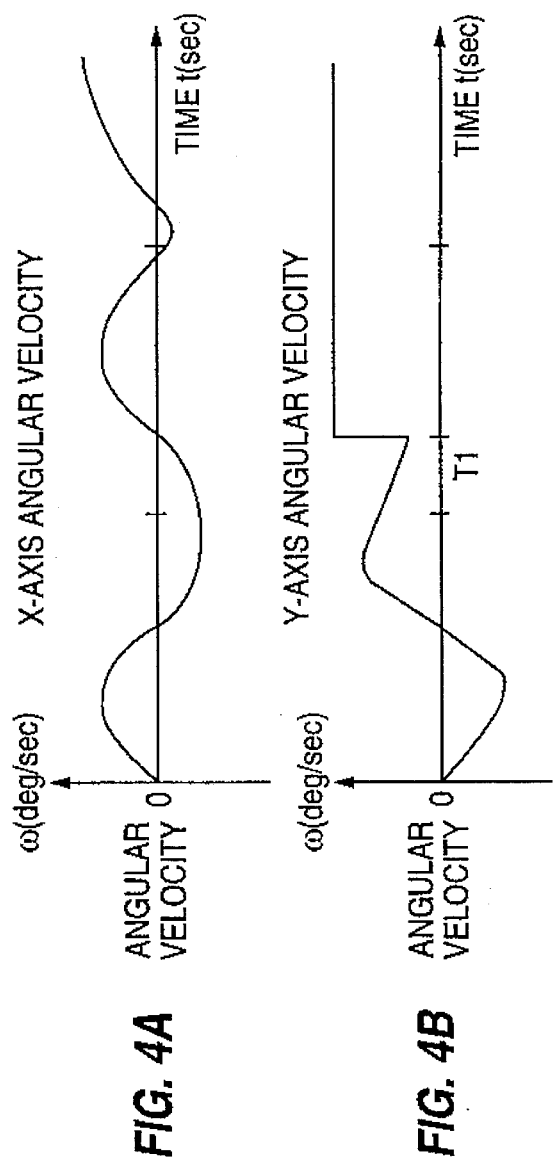
FIG. 4A
FIG. 4B
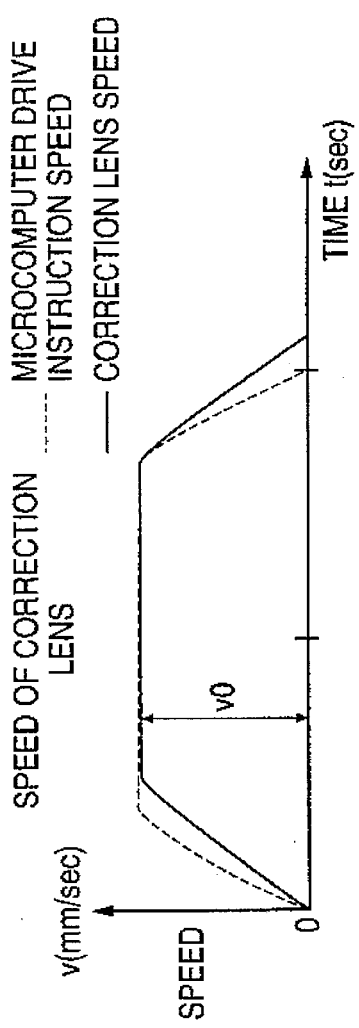
FIG. 5

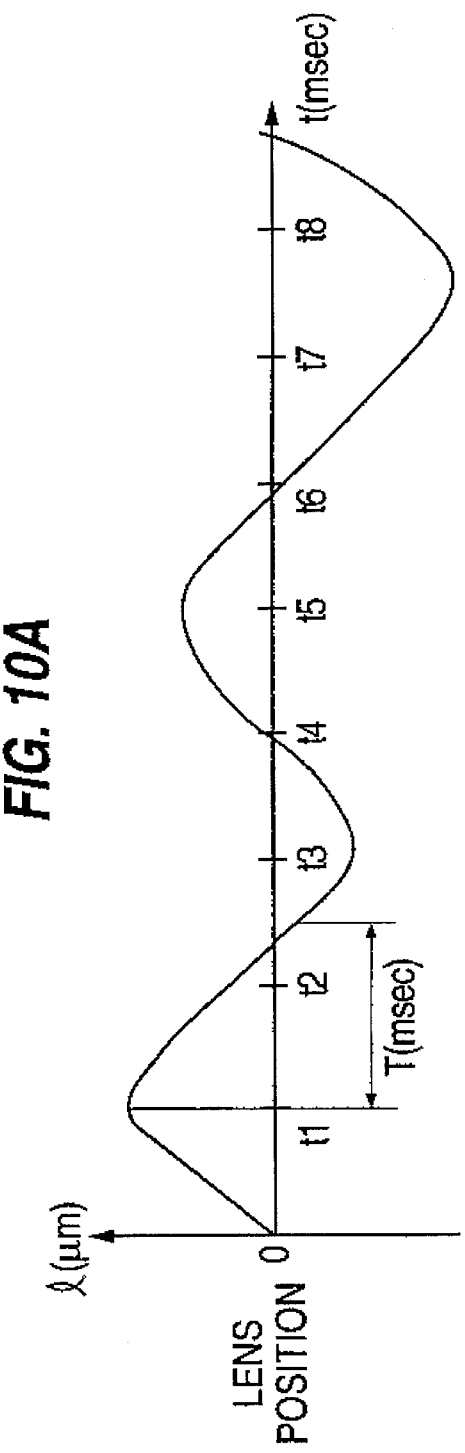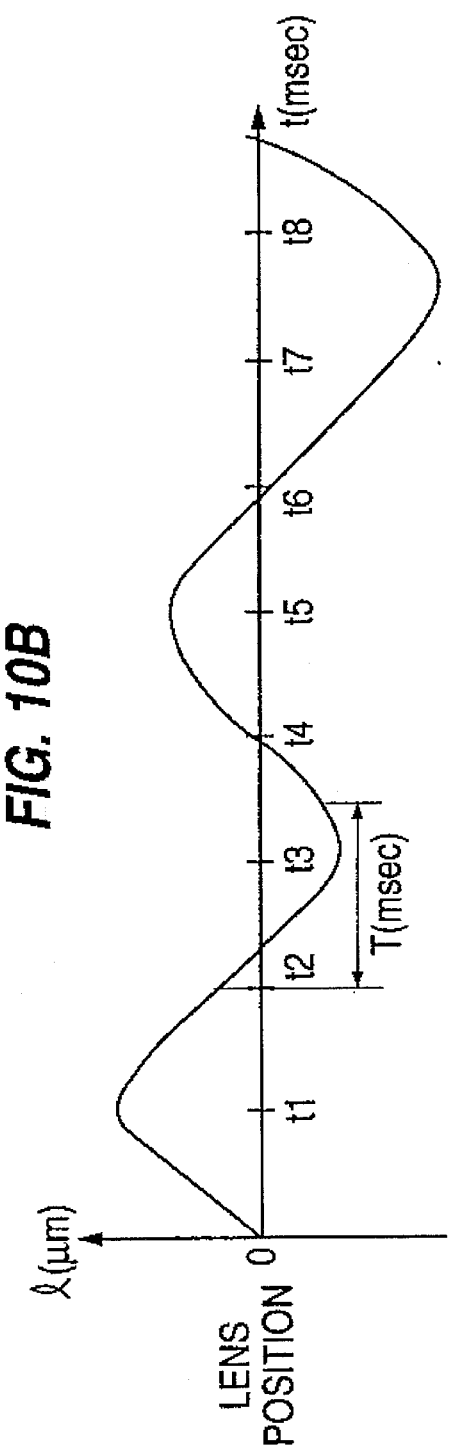

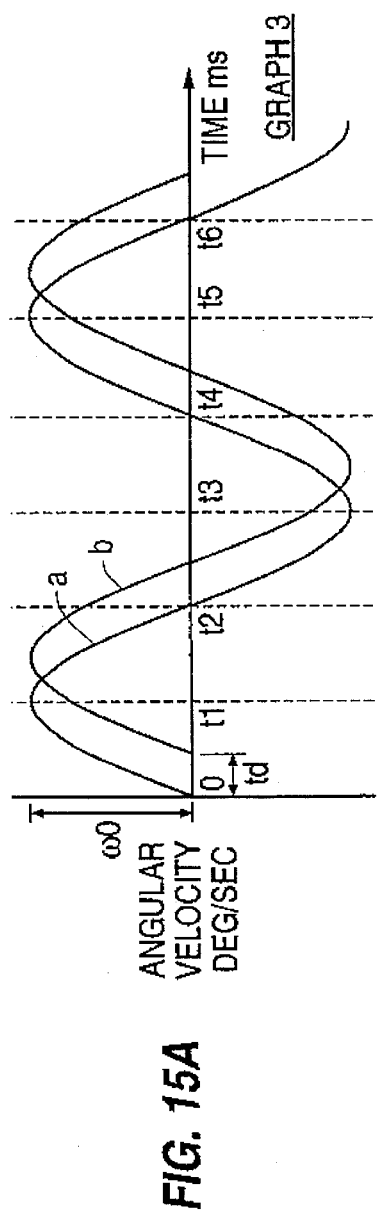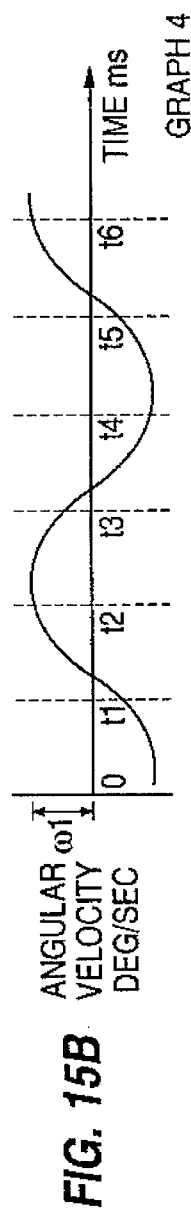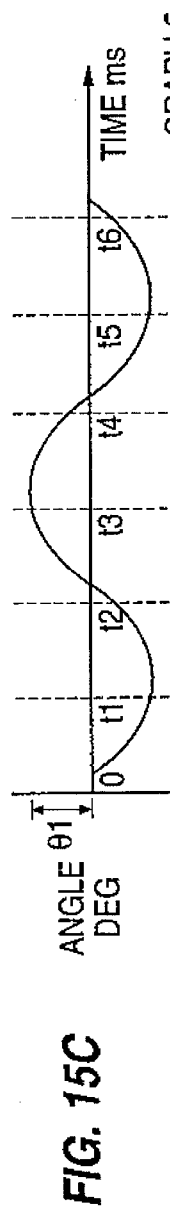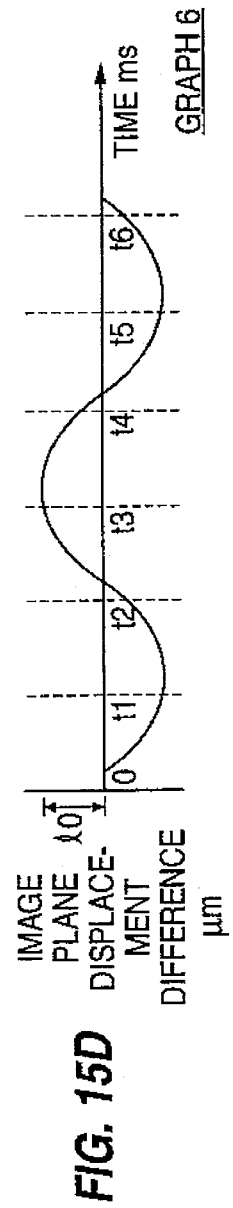
FIG. 15A
FIG. 15B
FIG. 15C
FIG. 15D

CAMERA HAVING ANTI-VIBRATION FUNCTION

This application is a continuation of application Ser. No. 08/170,888, filed Dec. 21, 1993, now abandoned.

BACKGROUND OF THE INVENTION

1. Field of the Invention

The present invention relates to a camera having an anti-vibration function which corrects for the vibration of a camera such that image vibration does not occur, and, more particularly, to a camera which compensates for anomalies which arise when the anti-vibration function is being performed.

2. Description of the Related Art

Cameras are known which provide an anti-vibration function to counteract image vibration due to hand tremors and the like which occur during hand-held photography. Specifically, the known types of cameras having an anti-vibration function include a vibration correction device which prevents image vibration from occurring due to vibration of the camera, and particularly, due to vibration of the camera caused by tilting or shaking motions. The vibration correction device detects a force received when a body rotates ("coriolis force") by using acceleration sensors and like vibration detection sensors, such as angular velocity sensors or piezoelectric elements. Based upon the result of the detection by the sensors, a main optical system of the camera comprising a photographic lens system, or a portion of the optical system, such as an optical system for vibration correction, is shifted to compensate for vibration in a plane which is orthogonal relative to the optical axis of the main optical system.

In operation, a camera having the above-described anti-vibration function corrects for vibration caused, e.g., by a hand tremor, by detecting the angular velocity of the camera or the acceleration of the vibration of the camera when the hand tremor occurs. An appropriate correction quantity for correcting the image vibration in an imaging plane due to the hand tremor is calculated by a microcomputer or like calculating device based upon the detected angular velocity or acceleration. A lens system for vibration correction which is disposed in a lens barrel of the camera is moved in an up/down, left/right direction, via a drive mechanism, in accordance with the calculated correction quantity to perform a correction of the photographic optical path such that the image in the imaging plane becomes stationary. The above-described vibration correction device utilizes a solenoid, an electromotive motor, or the like as an actuator in order to drive a lens system or prism for vibration correction.

The known cameras having an anti-vibration function suffer from various drawbacks. For example, when an anomaly arises in a vibration detection sensor which detects states of vibrational motion due, e.g., to a hand tremor, and the anomaly in the sensor causes the sensor to produce no output when detecting a hand tremor, the following problem arises. Specifically, when an anomaly in the sensor occurs, correction of the photographic light path is not performed by means of the optical system for vibration correction, a lens system or prism, etc. for vibration correction. As a result, even when correcting for camera vibration caused by a hand tremor using the anti-vibration function, a blurred photograph is taken.

Additionally, even when the sensor acts normally, anomalies arise in a vibration correction optical system which drives a lens system, prism or the like. When correction of the photographic light path is not performed, even when photography is performed with the correction of hand tremor using the anti-vibration function, a blurred photograph is taken. Furthermore, when a blurred photograph was taken, the blurred photograph is not noticed until the film is developed.

Another problem arising in the known cameras having an anti-vibration function, is that when a mechanical type of drive mechanism is used to drive a vibration correction lens system located in a lens barrel of the camera, it is unavoidable that some degree of chatter arises in the gears and the like which comprise the drive mechanism. When the vibration correction lens system is driven in one direction, the chatter is biased to one side. When the drive direction of the vibration correction lens system is reversed, during the interval during which the drive direction is reversed, chatter arises in a reverse direction due to the biased direction of the chatter, and the amount of the chatter becomes a correction error.

Accordingly, because of the existence of the above-described correction error caused by chatter in the mechanical type drive mechanism, image vibration due to chatter remains in the image plane even when photography is performed with a camera having an anti-vibration function.

Yet another problem which arises in the known cameras having an anti-vibration function, is that a phase delay occurs in the output of a vibration detection circuit which includes a vibration detection sensor relative to the input of the vibration detection sensor. The phase delay results from passing the output of the vibration detection sensor through an amplifier to amplify the output from the vibration detection sensor, and then through a filter in order to perform cut-off of noise in the output of the sensor.

Due to the phase delay, a vibration caused, e.g., by a hand tremor, is corrected by the vibration correction lens system with a delay relative to the actual vibration in the image plane. Therefore, even when a vibration correction is performed, the image vibration in the image plane is not completely corrected, and a residual image vibration remains in the image plane.

Further, because of the phase delay caused by passing the output of the vibration detection sensor through an amplifier and filter and the resulting residual image vibration in the image plane, the amount of image vibration in the photographed picture due to residual phase delay is not constant, and varies according to the timing of depression of the release button. Therefore, pictures with large vibration or pictures with small vibration result from photography. The inventors have discovered the above-noted problems and have developed solutions to these problems.

SUMMARY OF THE INVENTION

Accordingly, it is an object of the present invention to provide a camera having an anti-vibration function to prevent image vibration in the image plane.

It is another object of the present invention to provide a camera including a vibration correction system which enables hand-held photography to be performed with hand tremor correction such that there is no image vibration in the image plane.

It is a further object of the present invention to provide a camera including a vibration correction system having a vibration correction optical system to prevent image vibration in the image plane such that when anomalies arise in the vibration correction optical system, normal vibration correction is not performed.

It is yet another object of the present invention to provide a camera including a vibration correction system having vibration detection sensors to detect vibration such that when anomalies arise in the vibration detection sensors, normal vibration correction is not performed.

It is yet a further object of the present invention to provide a camera having a vibration correction system which detects when photography is performed when the vibration is large and prevents erroneous actions from occurring in the vibration correction system.

It is yet a further object of the present invention to provide a camera having a vibration correction system which corrects for chatter or correction errors accompanying a lens drive when a mechanical drive mechanism is used to drive a vibration correction lens system.

It is a further object of the present invention to provide a camera having a vibration correction system which corrects for image vibration which remains in the image plane due to phase lag in a detection circuit.

Additional objects and advantages of the invention will be set forth in part in the description which follows, and, in part, will be obvious from the description, or may learned by practice of the invention.

The foregoing objects of the present invention are achieved by providing a camera which includes a vibration detection and correction device that detects vibration in a camera caused, e.g., by a hand tremor, and corrects for vibration of an image on an image plane caused by the camera vibration. The vibration correction system of the camera includes a control unit which detects an anomaly in the vibration detection and correction device and which inhibits correction of vibration when the anomaly is detected.

The above objects of the present invention may also be achieved with a vibration correction system which includes a vibration sensor to detect vibration in the camera and which outputs a signal representing the detected vibration. A vibration correction lens system corrects for image vibration in an image plane caused by the camera vibration, and the correction lens system is driven by a drive mechanism based upon the amount of vibration detected by the vibration sensor. A drive state detection device detects the direction in which the vibration correction lens system is being driven and, to prevent chatter in the drive mechanism from affecting vibration correction, the camera shutter is operated immediately after the drive direction of the vibration correction lens system is reversed.

The above objects are further achieved by a vibration correction system in a camera which includes a vibration detection device and a control unit to detect a delay between actual image vibration and the detected image vibration output by the vibration detection device. The delay in the output in the vibration detection device may be caused, e.g., by amplifier and noise filtering circuitry which process the signal output from the vibration detection device.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 4A and 4B are graphs showing an example of outputs of angular velocity sensors which detect camera vibration in the X-axis direction and in the Y-axis direction, respectively, during hand-held photography, wherein an anomaly has arisen in the output of the Y-axis angular velocity sensor, in accordance with the first embodiment of the present invention.

FIG. 5 is a graph showing an example of the drive speed of a vibration correction lens system in accordance with the first embodiment of the present invention.

FIGS. 10A and 10B are graphs showing examples of lens position with respect to time in a camera having a vibration correction system in accordance with the second embodiment of the present invention.

FIGS. 15A–15D are graphs which show examples of the phase delay in a detection circuit associated with an angular velocity sensor in accordance with the third embodiment of the present invention.

DESCRIPTION OF THE PREFERRED EMBODIMENTS

Figure 1:
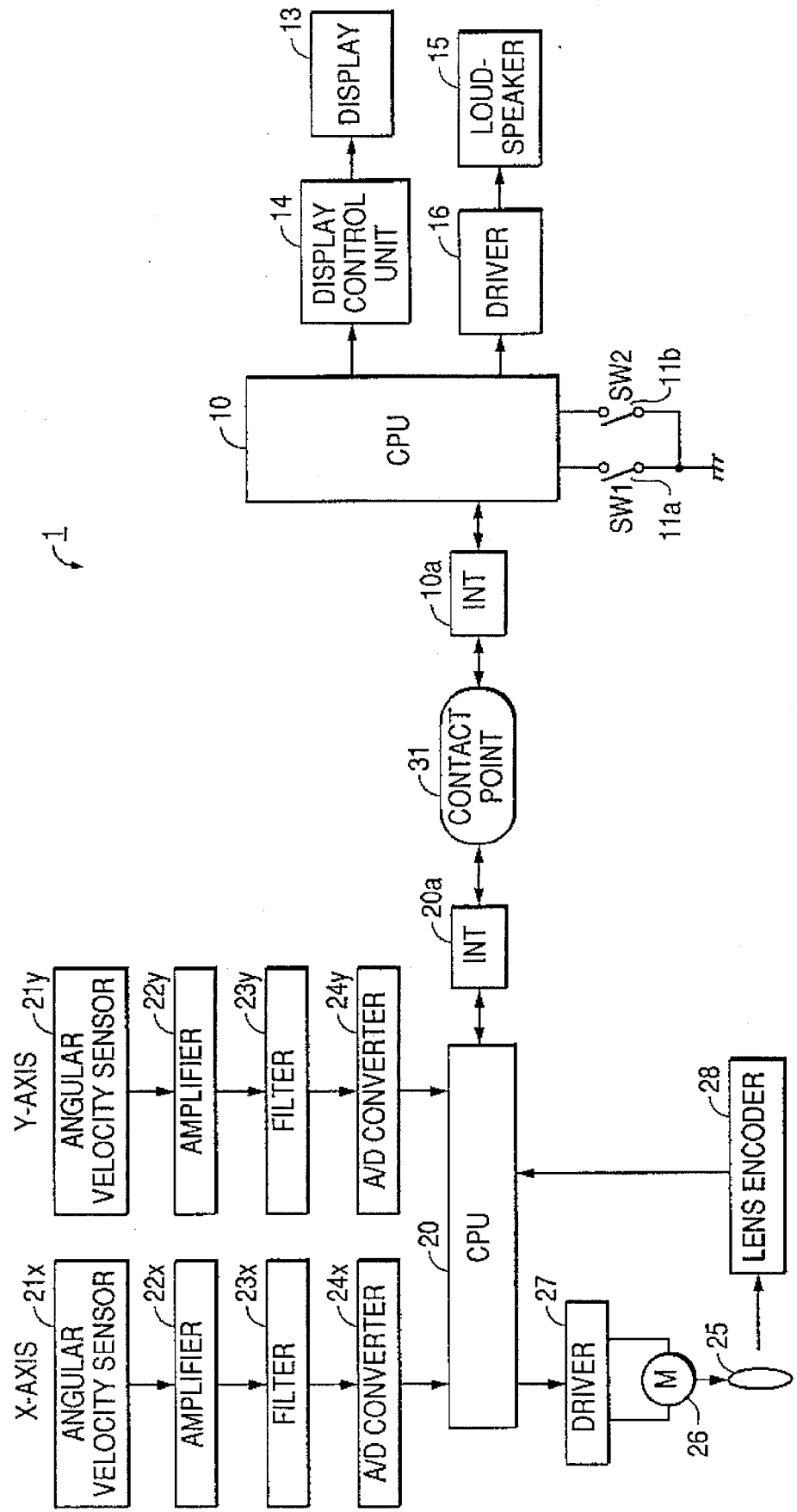
FIG. 1 is a block diagram of a vibration correction system in a camera in accordance with the first embodiment of the present invention.

Reference will now be made in detail to the present preferred embodiments of the present invention, examples of which are illustrated in the accompanying drawings, wherein like reference numerals refer to like elements throughout.

FIG. 1 is a block diagram of a vibration correction system in a camera in accordance with a first embodiment of the present invention. The vibration correction system generally referred to by reference numeral 1, corrects for vibration caused, e.g., by a hand tremor during hand-held photography or the like, such that vibration of an image on an image plane (not shown) does not occur. The vibration correction system includes a camera drive control CPU 10 to control photographic actions within the camera body (not shown), and a lens drive control CPU 20 to control the photographic actions of a lens barrel (not shown).

The vibration correction system 1 includes, associated with the lens drive control CPU 20, angular velocity sensors 21x and 21y. The angular velocity sensors 21x and 21y detect the angular velocity of vibration, due to a hand tremor or the like, in the left and right direction (X-axis) and in the up and down direction (Y-axis), respectively, of a camera including a lens barrel or other type of lens assembly. The outputs of the angular velocity sensors 21x and 21y are amplified by amplifiers 22x and 22y, respectively. The outputs of the amplifiers 22x and 22y are input to filters 23x and 23y, respectively, to cut-off high frequency noise in the amplified signals. The outputs of the filters 23x and 23y pass to analog-to-digital (A/D) converters 24x and 24y, respectively, which digitize the signals output from the filters 23x and 23y. The outputs of the A/D converters 24x and 24y, which are the X-axis and Y-axis vibration state signals, respectively, are the input to the lens drive control CPU 20.

The lens drive control CPU 20 calculates the amount of movement and the movement speed, due to a hand tremor or the like, of an image on the image plane according to the focal length, etc., of the photographic lens optical system, and according to the angular velocities of vibration in the X-axis and Y-axis directions detected by the angular velocity sensors 21x and 21y, respectively. The lens drive control CPU 20 calculates an appropriate drive speed for a vibration correction lens system 25 based upon the calculated amount of movement and movement speed of the image on the image plane.

The lens drive control CPU 20 provides a signal representing a calculated drive speed to a vibration correction lens system drive motor 26 via a driver 27 whereby the vibration correction lens system 25 is driven. Correction of vibration is performed by driving the vibration correction lens system 25 according to the drive speed calculated by the lens drive control CPU 20.

A lens encoder 28 (which is a drive position detection device) detects the position of the vibration correction lens system 25 driven by the vibration correction lens system drive motor 26. The output of the lens encoder 28 is input to the lens drive control CPU 20 which calculates drive position, drive speed, and drive direction of the vibration correction lens system 25 based upon the drive position signals from the lens encoder 28.

The camera drive control CPU 10 receives a signal from a release button (not shown) disposed on the camera body. A half-depression operation of the release button sets a photometer and rangefinder switch 11a (SW1) ON causing a photometer and rangefinder (not shown) to perform preliminary photographic actions. Further, upon full-depression of the release button, a release switch 11b (SW2) is set ON, and a shutter (not shown in the drawing) is opened and closed to take a photograph.

A display 13, which may be an LCD or like display element, displays various information, error warnings and the like which are output from the camera CPU 10 via a display control unit 14. Further, a speaker 15 provides audible warnings which are output from the camera drive control CPU 10 via a driver 16.

The camera drive control CPU 10 and the lens drive control CPU 20 transmit signals to each other via an interface (INT) 10a, contact point 31, and interface (INT) 20a. The lens drive control CPU 20 outputs to the camera drive control CPU 10 signals indicating whether or not the lens barrel is capable of performing an anti-vibration function, and signals indicating the focal length of the lens system, the aperture stop value, the drive direction of the vibration correction lens system 25, and the like. Further, the lens drive control CPU 20 outputs error signals to the camera CPU 10, and when the camera CPU 10 receives the error signals from the lens drive control CPU 20 a visible warning of an anomaly in an angular velocity sensor is displayed on the display 13. The camera drive control CPU 10 outputs to the lens drive control CPU 20 a half-depression operation signal, a release signal, and an exposure end signal.

FIGS. 2A and 2B, 3A and 3B, and 4A and 4B are graphs showing examples of the outputs of the angular velocity sensors 21x and 21y in the X-axis and Y-axis directions, respectively, during hand-held photography in accordance with the first embodiment of the present invention.

Figure 2A:
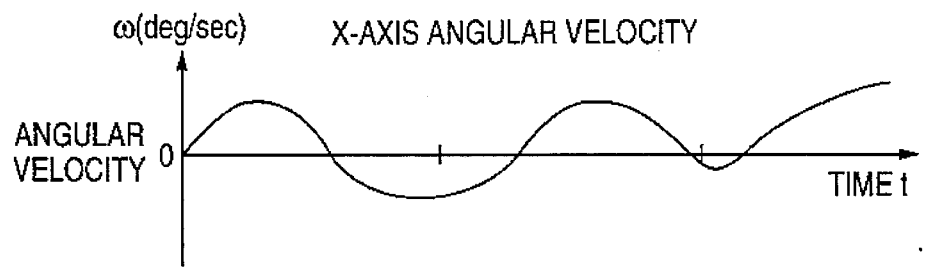
FIGS. 2A and 2B are graphs showing an example of outputs of angular velocity sensors which detect camera vibration in the X-axis direction and in the Y-axis direction, respectively, during hand-held photography in accordance with the first embodiment of the present invention.
Figure 2B:
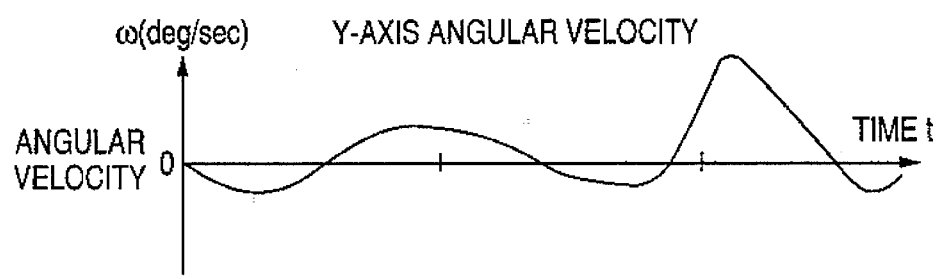

When hand-held photography is performed, since the camera vibrates due to continuous hand tremors, the outputs of the angular velocity sensors 21x and 21y do not have a constant value, but change continuously. FIGS. 2A and 2B are graphs showing an example of the angular velocity sensors 21x and 21y, respectively, during normal movement of a camera during hand-held photography. During normal movement of the camera, the outputs of the X-axis and Y-axis direction angular velocity sensors 21x and 21y, respectively, both change with respect to time.

Figure 3A:
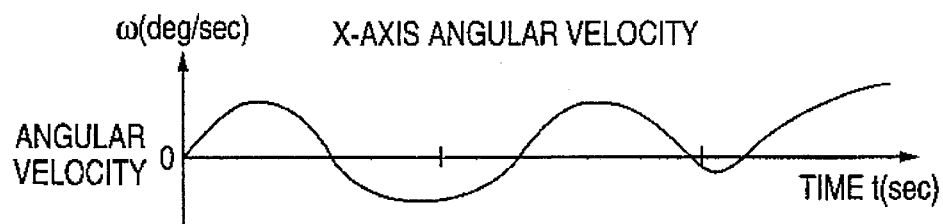
FIGS. 3A and 3B are graphs showing an example of outputs of angular velocity sensors in the X-axis direction and in the Y-axis direction, respectively, during hand-held photography, wherein an anomaly has arisen in the output of the Y-axis angular velocity sensor, in accordance with the first embodiment of the present invention.
Figure 3B:
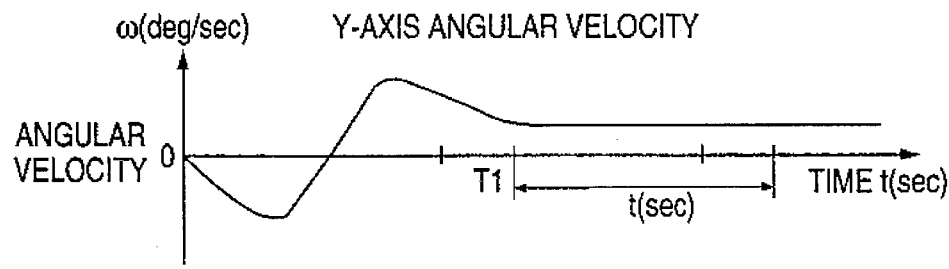

When the output of one of the angular velocity sensors 21x and 21y becomes a constant value, for example, the Y-axis angular velocity sensor 21y, regardless of the output of the X-axis angular velocity sensor 21x, it is judged that an anomaly has arisen for some reason in the angular velocity sensor 21y. FIGS. 3A and 3B are graphs showing an example of the outputs of angular velocity sensors 21x and 21y, respectively, when the output of the angular velocity sensor 21x corresponds to normal camera movement; however, due to an anomaly arising at time T1 in the Y-axis angular velocity sensor 21y, the output of the sensor 21y becomes a constant value after time T1.

FIGS. 4A and 4B are graphs showing an example of the outputs of angular velocity sensors 21x and 21y, respectively, when the output of the angular velocity sensor 21x corresponds to normal camera movement, but an anomaly arises at time T1 in the angular velocity sensor 21y which detects angular velocity in the Y-axis direction. Specifically, in the example shown in FIG. 4B, the output of the angular velocity sensor 21y at time T1 and thereafter reaches a value greatly exceeding the maximum value of the angular velocity caused by normal hand tremors during hand-held photography.

However, when the outputs of the angular velocity sensors 21x and 21y both become constant values, the probability is low that anomalies have arisen in both the X-axis and Y-axis angular velocity sensors 21x and 21y, respectively, and the probability is high that the camera has been fixed to a tripod or the like.

To detect the above-described types of anomalies, the camera CPU 10 detects, for example, the situation as shown in FIGS. 3A and 3B in which there is no change for a time t seconds in the output value of one of the angular velocities in the X-axis and Y-axis directions. An anomaly may also be detected by the camera CPU 10 when the angular velocity detected by one of the X-axis and Y-axis angular velocity sensors 21x and 21y, respectively, greatly exceeds the value of the angular velocity associated with normal hand tremors, as shown for example in FIGS. 4A and 4B.

To prevent an anomaly in an angular velocity sensor 21x and 21y from affecting photography, the vibration correction lens system 25 is held or maintained in a fixed position when the anomaly is detected, thereby inhibiting the vibration correction action even when a vibration correction function is set during photography. Further, an audible or visible warning of the anomaly in the angular velocity sensor 21x and 21y is provided via the driver 16 and loud speaker 15 or via the display 13 and display control 14.

Figure 6:
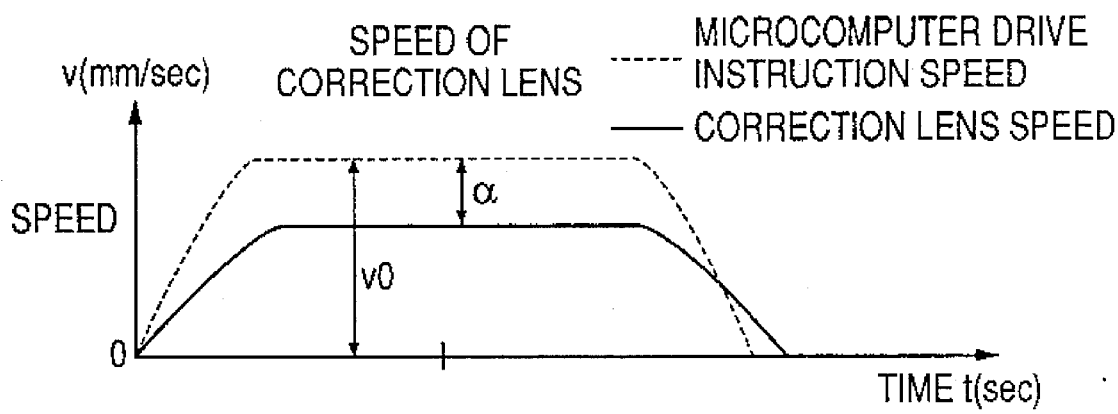
FIG. 6 is a graph showing an example of the drive speed of a vibration correction lens system in accordance with the first embodiment of the present invention.

FIGS. 5 and 6 are graphs showing an example of the drive speed of the vibration correction lens system 25 in accordance with the first embodiment of the present invention. The drive speed is determined by the output of the encoder 28 which detects the drive position of the vibration correction lens system 25. FIG. 5 is a graph corresponding to normal operation of the vibration correction lens system 25. FIG. 6 is a graph corresponding to operation when an anomaly has arisen in the vibration correction lens system 25.

As seen in FIG. 5, when the vibration correction lens system 25 is driven at a drive speed v0 in response to an instruction from the lens CPU 20, the speed of the vibration correction lens system 25 detected by the encoder 28 becomes v0. However, as seen in FIG. 6, when an anomaly has arisen in the vibration correction lens system 25, the drive speed of the vibration correction lens system 25 is slowed by a value α from the speed v0.

To detect whether there is an anomaly in the drive system of the vibration correction lens system 25, the lens CPU 20 detects the drive speed of the vibration correction lens system 25 based upon the output of the lens encoder 28. If the vibration correction lens system is being driven at a constant speed v0 and the drive speed v0 is slowed by a predetermined quantity α, or if the vibration correction lens system 25 is driven at a drive speed 0, it is judged that an anomaly has arisen in the drive system of the vibration correction lens system 25. When the camera is set to perform photography using the vibration correction function, and an anomaly is detected in the drive system of the vibration correction lens system 25, the vibration correction lens system is held in a fixed position, and accordingly, vibration correction is inhibited.

Furthermore, when the vibration correction function is inhibited, the lens CPU 20 outputs error signals to the camera CPU 10. When the camera CPU 10 receives the error signals the display 13 is operated via the display control unit 14 to display a warning of an anomaly in the angular velocity sensors 21x and 21y, or in the drive system of the vibration correction lens system 25. An audible warning is also performed on the loud speaker 15 via the driver 16.

Figure 7:
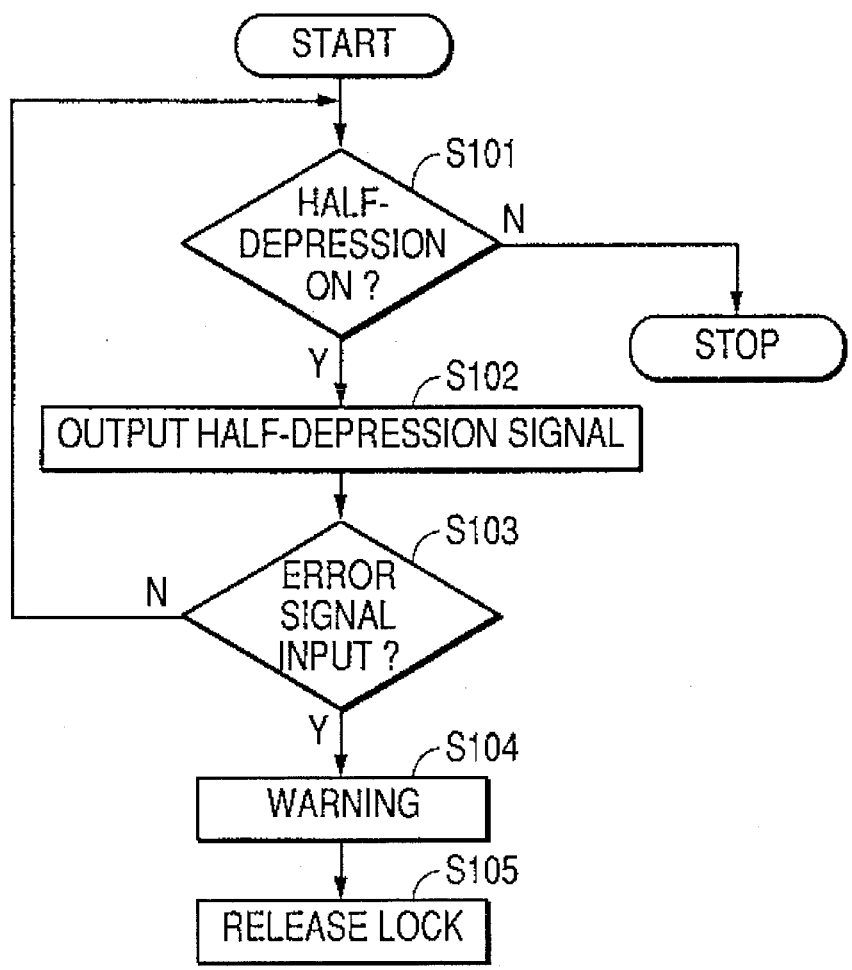
FIG. 7 is a flow chart showing an example of a control routine executed by a camera CPU in accordance with the first embodiment of the present invention.

FIG. 7 is a flow chart showing an example of a control routine performed by the camera CPU 10 when an anomaly has arisen in the vibration correction system during the photographic action of a camera in accordance with the first embodiment of the present invention.

Beginning in step S101, it is determined whether or not the release button on the camera is half-depressed and the photometer and rangefinder switch 11a is set ON. If the determination in step S101 is negative and the photometer and rangefinder switch 11a is OFF, the control routine is immediately ended. However, when step S101 is affirmative and the release button is half-depressed and the photometer and rangefinder switch 11a is determined to be ON, the control routine proceeds to step S102. In step S102, a half-depression signal is output to the lens CPU 20 to indicate that the photometer and rangefinder switch 11a is ON, and that the camera has entered the half-depression operation state.

Continuing in step S103, it is determined whether an error signal has been input to the camera CPU 10 from the lens CPU 20 because of a detected anomaly in the angular velocity sensors 21x and 21y. When the determination in step S103 is negative, the control routine returns to step S101, and steps S101 through S103 are performed until the photometer and rangefinder switch 11a is set OFF. However, when the determination in step S103 is affirmative, and an error signal has been input to the camera CPU 10 from the lens CPU 20, the control routine proceeds to step S104 and a warning is given on the display 13 or by a loudspeaker 15 that an anomaly has arisen in at least one of the vibration detection angular velocity sensors 21x and 21y. The control routine then proceeds to step S105 and a release lock is performed in order to inhibit photography thereby preventing a blurred photograph from being taken.

In the control routine described above, when no error signal has been received from the lens CPU 20, normal photographic actions are performed including photometry, rangefinding, autofocus (AF), shutter opening and closing routine, etc.

Figure 8:
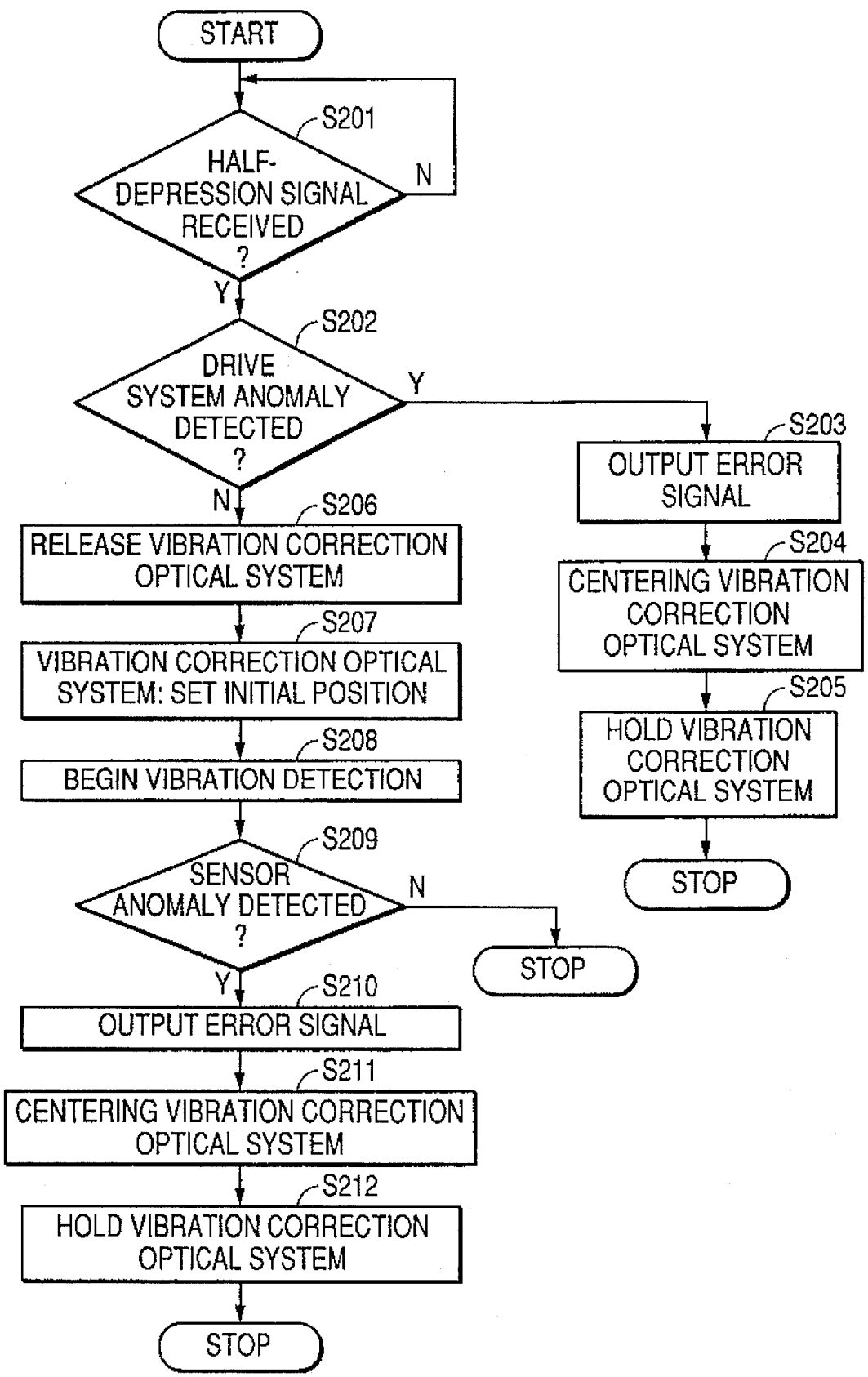
FIG. 8 is a flow chart showing an example of a control routine executed by a lens CPU in accordance with the first embodiment of the present invention.

FIG. 8 is a flow chart showing an example of a control routine performed by the lens CPU 20 when an anomaly has arisen in the vibration correction system during the photographic action of camera in accordance with the first embodiment of the present invention. The vibration correction action of the vibration correction lens system 25 will now be described below with respect to the flow chart of FIG. 8.

Beginning in step S201, the control routine waits for a signal from the camera CPU 10 indicating that the release button is half-depressed. When the half-depression signal is received from the camera CPU 10, the control routine proceeds to step S202 where it is detected whether or not an anomaly has arisen in the drive system of the vibration correction lens system 25 due to motor 26, driver 27, lens CPU 20, or the like. When step S202 is affirmative, and an anomaly has been detected in the drive system of the vibration correction lens system 25, the control routine proceeds to step S203 and an error signal is output to the camera CPU 10. Next, in step S204, the vibration correction optical system of vibration correction lens system 25 is centered. Proceeding to step S205, the vibration correction optical system which has been centered in step S204 is held at its centered position, and movement of the vibration correction optical system is stopped.

However, when an anomaly has not been detected in step S202, the control routine proceeds to step S206 where the vibration correction optical system of the vibration correction lens system 25 is released from a predetermined position in which it has been held. Next, in step S207, the vibration correction optical system of the vibration correction lens system 25 is set to an initial position. Continuing in step S208, detection of the angular velocities in the X-axis and Y-axis directions by the vibration detection sensors 21x and 21y, respectively, is commenced. Proceeding to step S209, it is determined whether an anomaly has arisen in the vibration detection sensors 21x and 21y during the detection of vibration angular velocity commenced in step S208.

When an anomaly has been detected in the vibration detection angular velocity sensors 21x and 21y in step S209, the control routine proceeds to step S210 where an error signal is output to the camera CPU 10. Next, in step S211, centering of the vibration correction optical system of the vibration correction lens system 25 is preformed. Proceeding to step S212, the centered position of the vibration correction optical system of the vibration correction lens system is held, thereby inhibiting vibration correction action.

However, when no anomaly in the sensors 21x and 21y has been detected in step S209, vibration correction is performed according to the correction amount and correction direction calculated by the lens CPU 20 based upon the detection results of the vibration detection angular velocity sensors 21x and 21y. The vibration correction optical system of the vibration correction lens system 25 is thereby suitably controlled and driven and photography is performed without vibration.

Therefore, in accordance with the first embodiment of the present invention, by stopping vibration correction action when the operation of the vibration correction system has become anomalous, erroneous vibration correction due to the anomalous state of the vibration correction system may be prevented.

In particular, when an anomaly arises in the vibration detection angular velocity sensors 21x and 21y, the vibration correction optical system of the vibration correction lens system 25 can be held in a state in which a vibration correction action is not performed, and erroneous action may be avoided in this manner. Thus, taking a blurred photograph due to an anomalous state of the vibration detection angular velocity sensors 21x and 21y can be avoided.

Further, in accordance with the first embodiment of the present invention, when the encoder 28 detects that the state of operation of the vibration correction optical system of the vibration correction lens system 25 or its drive system is in an anomalous state, the action of the vibration correction optical system of the vibration correction lens system 25 or its drive system is stopped to prevent erroneous vibration correction. Additionally, control is performed such that the photographic action in the camera is prevented.

A warning to the photographer that an anomalous state has arisen in the vibration detection angular velocity sensors 21x and 21y can be rapidly and reliably given by the display 13 or the loudspeaker 15, thus making the photographer aware of the anomalous state before the film has been developed.

Although the first embodiment of the present invention has been described with respect to specific components for the vibration correction system, it will be recognized that the first embodiment is not limited to those specific components. For example, although the first embodiment has been described with respect to angular velocity sensors to detect the vibration of the camera, it will be recognized that other kinds of vibration detection sensors may be used. Further, it will be recognized that other types of drive mechanisms and drive control mechanisms and the like may be employed in accordance with the first embodiment of the present invention.

Figure 9:
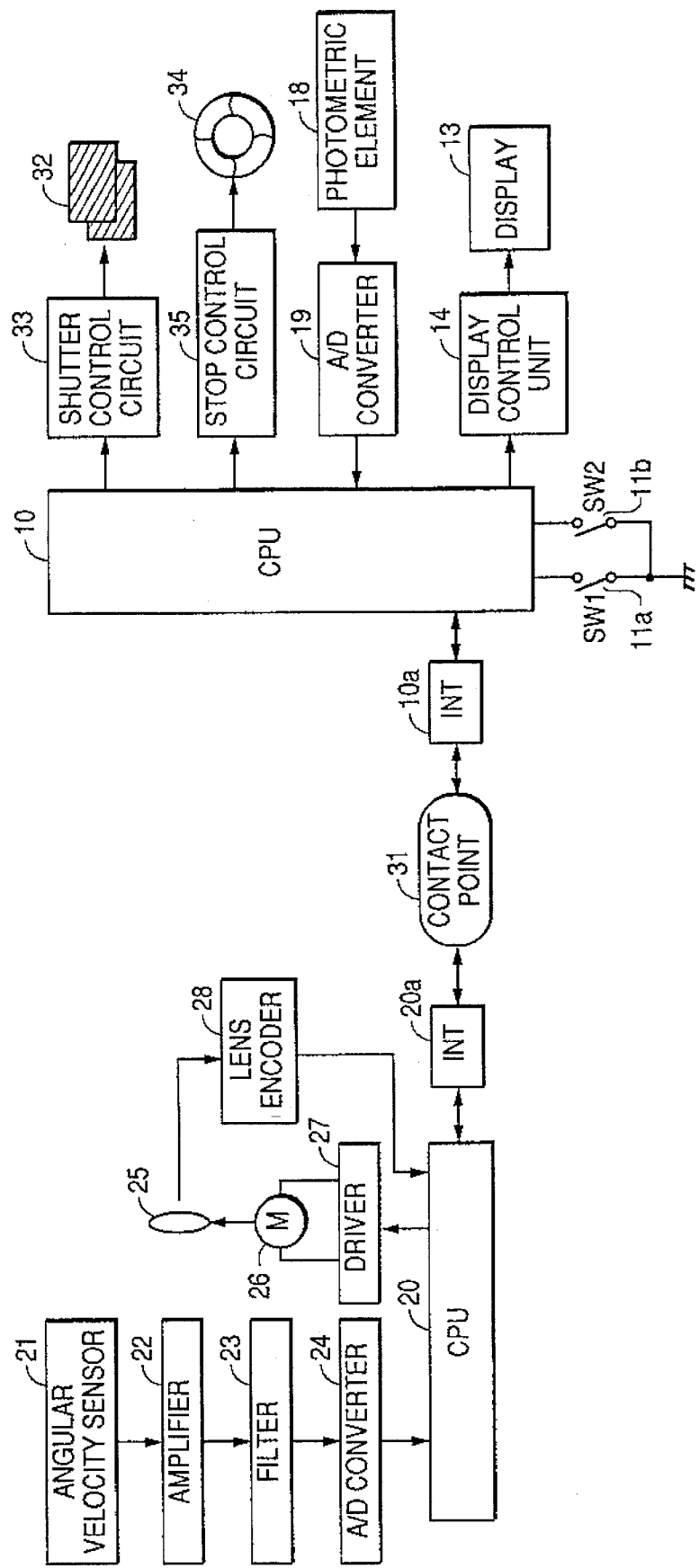
FIG. 9 is a block diagram of a vibration correction system in a camera in accordance with a second embodiment of the present invention.

FIG. 9 is a block diagram of a vibration correction system in a camera in accordance with a second embodiment of the present invention. Like elements in the figures of the first and second embodiments are referred to by like reference numerals, and a description of the like elements will not be repeated in detail here.

In accordance with the second embodiment of the present invention, an angular velocity sensor 21 detects the angular velocity of vibration of the camera due, e.g., to a hand tremor or the like. A signal indicating the detected angular velocity is output by the angular velocity sensor 21 and is amplified by an amplifier 22. The output of the amplifier 22 is input to a filter 23 which performs high frequency noise cut-off, and the output of the filter is passed to an A/D converter 24. The A/D converter 24 performs analog-to-digital conversion of the signal output from the filter 23 and the output of the A/D converter 24 is input to the lens drive control CPU 20.

The lens drive control CPU 20 calculates an amount of movement and a movement speed of an image on the image plane, according to the focal length, etc., of the photographic lens optical system, and according to the angular velocity of vibration input from the angular velocity sensor 21 via the amplifier 22, the filter 23, and the A/D converter 24. Based upon the calculated amount of movement and movement speed of the image on the image plane, the lens drive control CPU 20 calculates the appropriate drive speed for a vibration correction lens system 25. The vibration correction lens system 25 is driven according to the drive speed calculated by the lens drive control CPU 20 via the driver 27 and a motor 26 in the same manner as described with respect to the first embodiment shown in FIG. 1. Further, the encoder 28 detects the position of the vibration correction lens system 25 in order that the lens CPU 20 may calculate the drive position, drive speed and drive direction of the vibration correction lens system in the same manner as described above with respect to the first embodiment.

A shutter control circuit 33 receives a signal from the camera CPU 10 and performs transit drive control of a front blind and rear blind of a shutter 32. Further, a stop control circuit 35 receives a signal from the camera CPU 10 to perform stopping down and opening up of a stop 34. A photometric element 18 is provided to detect brightness information regarding a subject which is input to the camera CPU 10 via an A/D converter 19.

The lens CPU 20 and camera CPU 10 send and receive signals from each other via interface (INT) 10a, contact point 31, and interface (INT) 20a as described with respect to the first embodiment of the present invention. Further, switches 11a, 11b and display control unit 14 and display 13 also operate in the same manner as described with respect to the first embodiment of the present invention.

FIGS. 10A and 10B are graphs showing an example of the drive position of the vibration correction lens system 25 detected by the encoder 28 when vibration correction is performed in accordance with the second embodiment of the present invention.

When, for example, the drive direction of the vibration correction lens system 25 is a fixed direction, the mechanical chatter of the drive mechanism driving the vibration correction lens system 25 is biased in one direction and the correction error caused by chatter in the drive mechanism is minimal. However, when the drive direction of the vibration correction lens system 25 is reversed, although the mechanical chatter is biased in one direction, due to the reversal in drive direction the correction error caused by the mechanical chatter corresponds to the magnitude of the mechanical chatter.

For example, as shown in FIG. 10A, the direction of the vibration correction lens system 25 is reversed at a time t1 and exposure is performed by opening and closing the shutter 32 for a time T(msec) which begins directly after the drive direction of the vibration correction lens system 25 was reversed at time t1. Thus, the drive direction was not reversed during the shutter time T(msec) and, therefore, error caused by mechanical chatter did not enter into the photographed picture.

However, as shown in FIG. 10B, when an exposure is performed by opening and closing the shutter 32 for a shutter time T(msec) beginning at an arbitrary time t2, and the drive direction of the vibration correction lens system 25 is reversed during the shutter time T(msec), error caused by the mechanical chatter enters into the photographed picture, and a blurred photograph is taken.

Therefore, when the shutter 32 is opened and closed to perform exposure immediately after the drive direction of the vibration correction lens system 25 reverses, error due to mechanical chatter does not enter into the photographed picture. Accordingly, it is possible to minimize the effect of correction errors due to mechanical chatter in the drive mechanism of the vibration correction lens system 25 by eliminating reversal of the drive direction of the vibration correction lens system 25 during shutter time.

Figure 11:
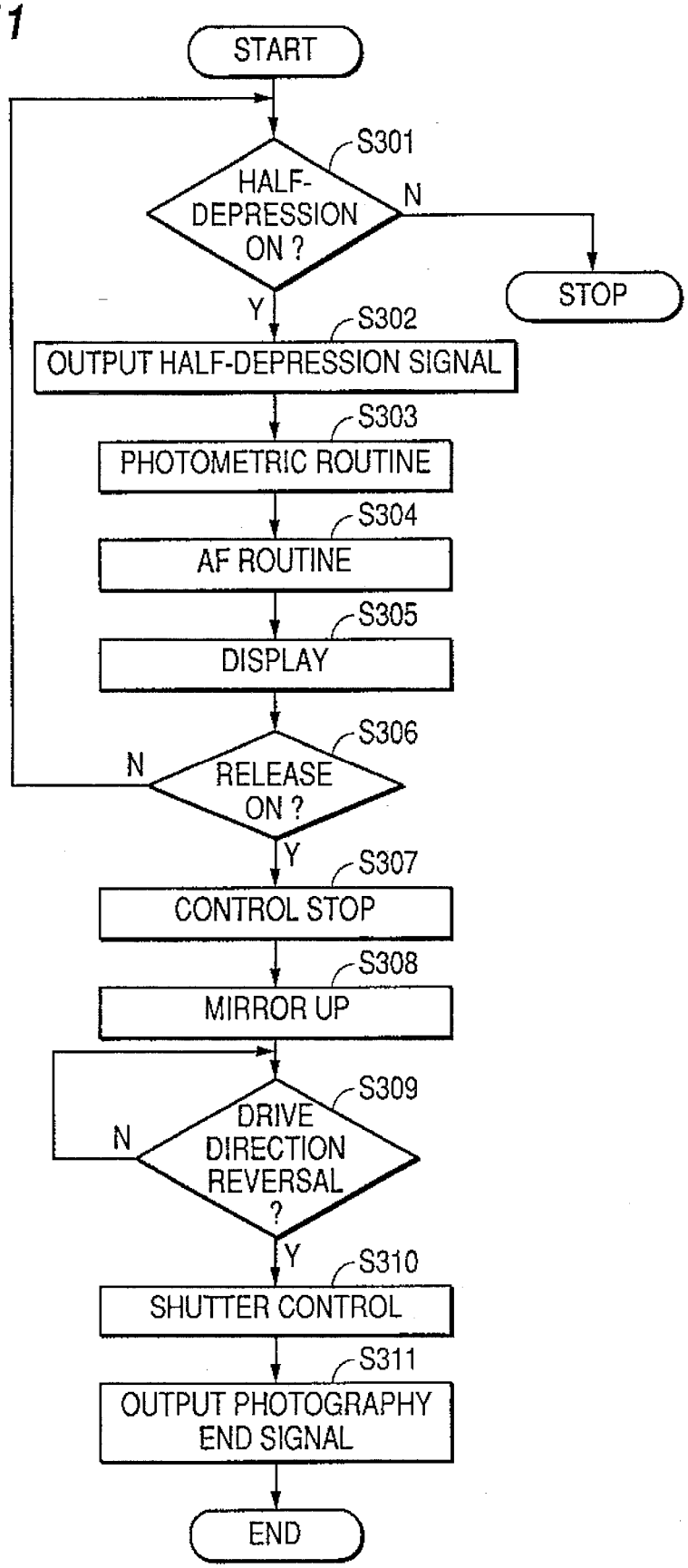
FIG. 11 is a flow chart showing an example of a control routine performed by the camera CPU in accordance with the second embodiment of the present invention.

FIG. 11 is a flow chart showing an example of a control routine performed by the camera CPU 10 in accordance with the second embodiment of the present invention.

Beginning in step S301, it is determined whether or not the release button on the camera body is half-depressed and the photometer and rangefinder switch 11a is set ON. If the photometer and rangefinder switch 11a is OFF, the control routine immediately ends. However, when the photometer and rangefinder switch 11a is ON, the control routine proceeds to step S302, and a half-depression signal is output to the lens CPU 20 indicating that the photometer and rangefinder switch 11a is ON, and that the camera has entered the half-depression operation state.

Continuing in step S303, a photometric routine is entered and photometric information regarding subject brightness is introduced to the camera CPU 10 via the photometric element 18 and the A/D converter 19. A stop value and shutter speed value are determined based upon the photometric information in order to obtain a suitable exposure. Proceeding to step S304, an autofocus (AF) routine is entered, rangefinder information is introduced, and focusing is performed. Next, in step S305, the stop value and shutter speed determined in step S303 above are displayed on the display 13.

In step S306, it is determined whether or not the release switch 11b is ON. If the determination in step S306 is negative, the control routine returns to step S301 and the sequence of step S301 through step S305 is repeated until the photometer and rangefinder switch 11a is set OFF. However, if the determination in step S306 is affirmative and the release switch 11b is ON, the control routine proceeds to step S307 where the stop 34 is adjusted via the stop control circuit 35 to the stop value determined in step S303. Next, in step S308, a mirror (not shown) is raised.

Continuing in step S309, the control routine waits for the camera CPU 10 to receive a signal from the lens CPU 20 indicating the reversal of the drive direction of the vibration correction lens system 25. Next, in step S310, after a signal indicating the reversal of the drive direction of the vibration correction lens system 25 has been received in step S309, transit drive control of the front blind and rear blind of the shutter 32 via the shutter control circuit 33 is performed based upon the shutter speed determined in step S303. Finally, in step S311, after exposure control has been preformed by opening and closing the shutter 32, since it is known that the photographic exposure action has ended, a correction end signal is output to the lens CPU 20 and the control routine ends.

Figure 12:
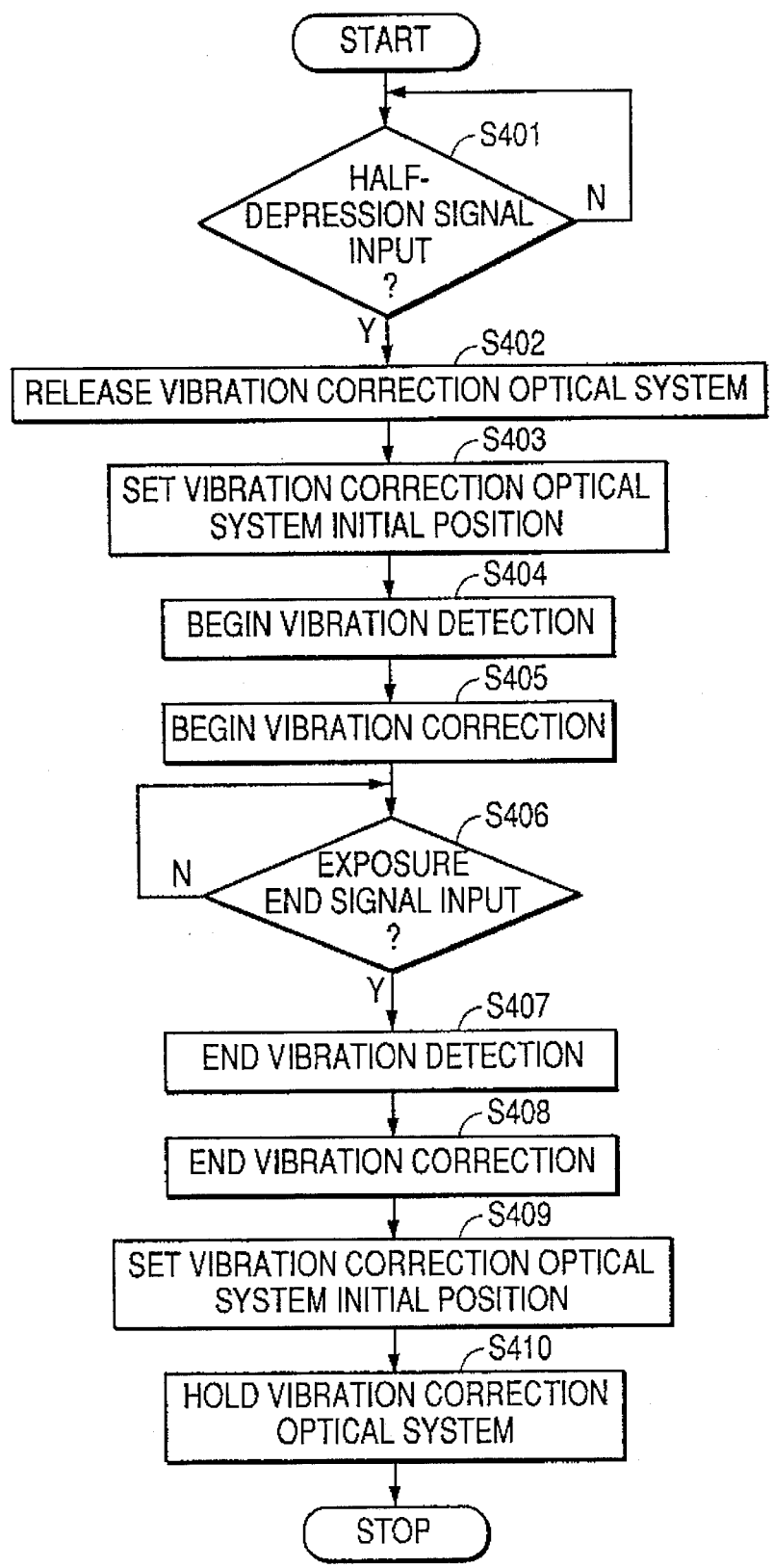
FIG. 12 is a flow chart showing an example of a control routine performed by the lens CPU in accordance with the second embodiment of the present invention.

FIG. 12 is a flow chart showing an example of a control routine executed by the lens CPU 20 in a camera in accordance with the second embodiment of the present invention.

Beginning in step S401, the control routine waits until a release button half-depression signal is received by the lens CPU 20 from the camera CPU 10. When the half-depression signal has been received by the lens CPU 20 from the camera CPU 10, the control routine proceeds to step S402 where the vibration correction optical system of the vibration correction lens system 25 is released from a fixed position at which it has been held. Next, in step S403, the vibration correction optical system of the vibration correction lens system 25 is set to an initial position. Proceeding to step S404, detection of the vibration angular velocity of the camera by the vibration detection sensor 21 is commenced. Continuing in step S405, based upon the detected vibration angular velocity determined in step S404, the vibration correction lens system 25 is driven from its initial position set in step S403 by the motor 26 via the driver 27, thereby commencing the correction of vibration.

In step S406, the control routine waits for the lens CPU 20 to receive an exposure end signal from the camera CPU 10. When the exposure end signal has been received by the lens CPU 20 from the camera CPU 10 in step S406, the control routine proceeds to step S407 where the determination of the amount of vibration by the vibration detection sensor 21 is ended. Continuing in step S408, the drive of the vibration correction motor 26 is stopped and the correction of vibration is ended. Next, in step S409, the vibration correction optical system of the vibration correction lens system 25 is set to an initial position. Finally, in step S410, the position of the vibration correction optical system of the vibration correction lens system 25 is maintained (held in a fixed position) and the control routine ends.

Therefore, in accordance with the second embodiment of the present invention, photographic exposure is performed by commencing opening and closing of the shutter 32 after the mechanical chatter of the drive mechanism of the vibration correction lens system 25 has been biased in the reverse direction. By performing photographic exposure after the reversal of the drive direction of the vibration correction lens system 25, the mechanical chatter caused by the drive mechanism does not affect photography. Accordingly, a photograph may be taken wherein the correction error due to the mechanical chatter in the drive mechanism of the vibration correction lens system 25 has little affect.

More specifically, since the opening and closing of the shutter 32 is performed with timing such that reversal of the drive direction of the vibration correction lens system 25 during an exposure is unlikely, it is possible for a residual correction error in the photographic picture to be small. Thus, by performing photography using the vibration correction function, because of the reliable performance of vibration correction up to a fixed level, photography is performed with few failures.

Although the second embodiment of the present invention has been described with respect to a particular system for performing vibration correction, it will be recognized that the second embodiment is not limited to the particular system and many modifications and changes are possible. For example, although the first embodiment has been described with respect to angular velocity sensors to detect the vibration of the camera, it will be recognized that other types of sensors may be used, e.g., acceleration sensors or piezoelectric elements. Further, it will be recognized that other types of drive mechanisms and drive control mechanisms may be employed in accordance with the second embodiment of the present invention.

Figure 13:
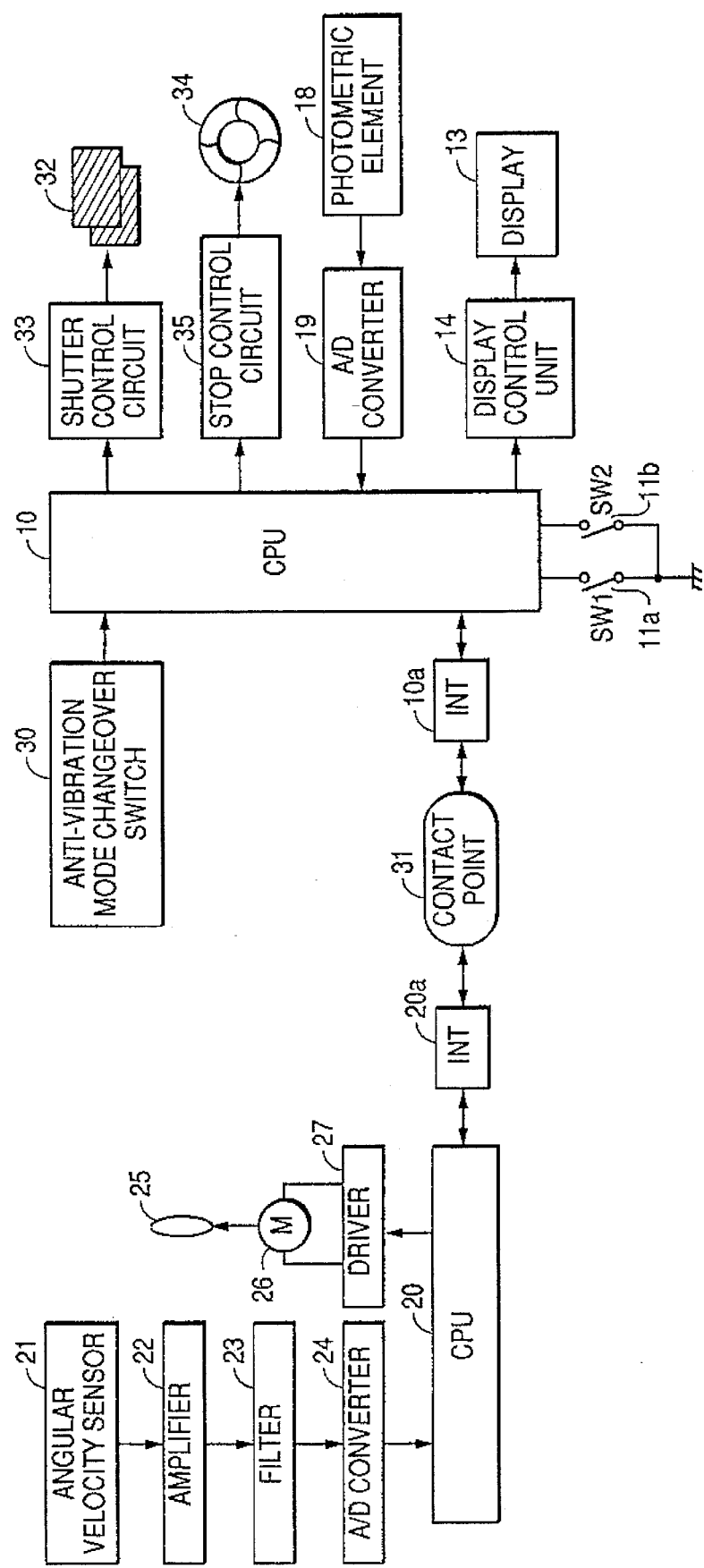
FIG. 13 is a block diagram of a vibration correction system in a camera in accordance with a third embodiment of the present invention.

FIG. 13 is a block diagram of a vibration correction system in a camera in accordance with a third embodiment of the present invention. Like elements in the figures of the first, second and third embodiments are referred to by like reference numerals, and a description of the like elements will not be repeated in detail here. The vibration correction system of the third embodiment, shown in FIG. 13, includes the same components as the vibration correction system of the second embodiment, shown in FIG. 9, with the exception that an anti-vibration mode changeover switch 30 is provided to input a signal to the camera drive control CPU 10.

In accordance with the third embodiment of the present invention, when the release switch 11b (SW2) is ON and photography is performed by the opening and closing action of the shutter 32, if the anti-vibration mode changeover switch 30 is ON and an angular velocity signal "0" is input from the lens CPU 20, the opening and closing action of the shutter 32 is commenced via the shutter control circuit 33. However, when the anti-vibration mode changeover switch 30 is OFF, regardless of the value of the angular velocity, the opening and closing action of the shutter 32 is commenced in the normal manner via the shutter control circuit 33.

The camera CPU 10 receives from the lens CPU 20 via interface (INT) 10a, contact point 31, and interlace (INT) 20a, signals indicating whether or not the lens barrel is equipped with an anti-vibration function and signals indicating the focal length of the lens system, the aperture stop value, the angular velocity "0" signal, and the like. The lens CPU 20 receives from the camera CPU 10 signals including a half-depression operation signal, a release signal, and an exposure end signal.

Figure 14A:
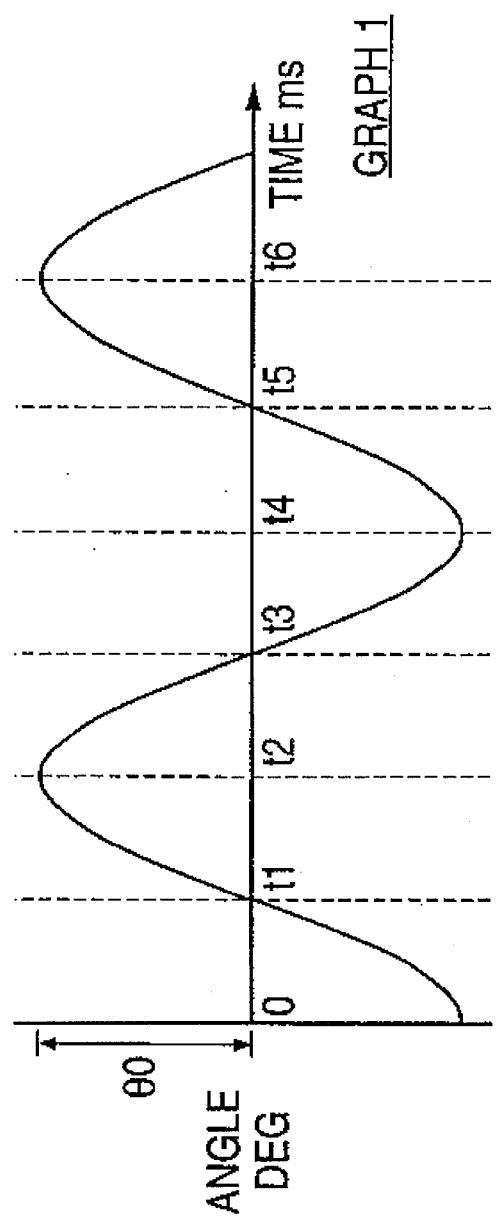
FIGS. 14A and 14B are graphs showing examples of values of the angle determined by integrating an angular velocity detected by an angular velocity sensor and the angular velocity determined by the sensor, respectively, in a camera in accordance with the third embodiment of the present invention.
Figure 14B:
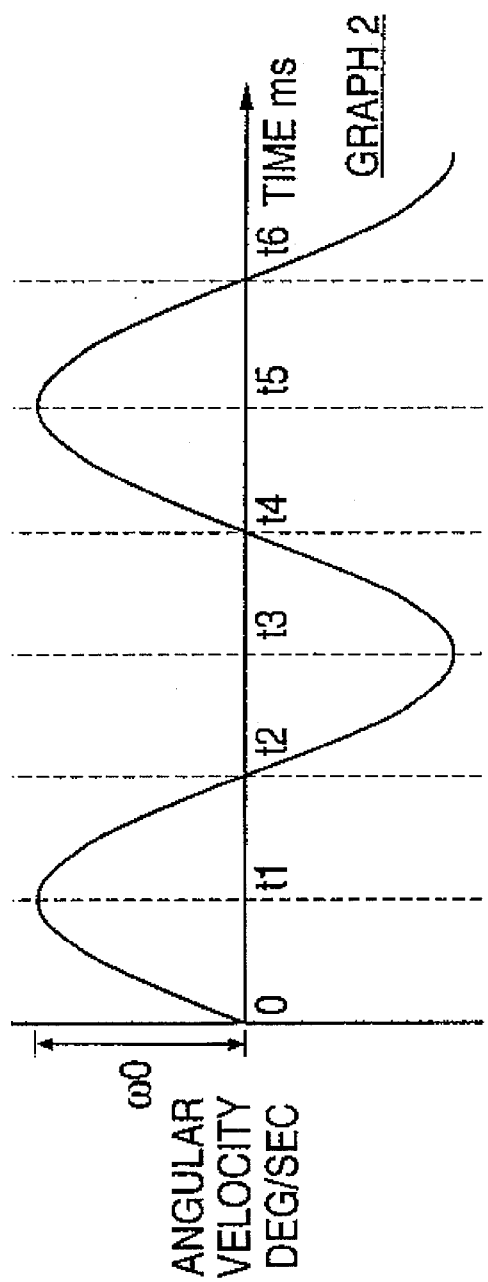

FIG. 14A is a graph showing an example of the values of the angle determined by integrating an angular velocity detected by the angular velocity sensor 21, and FIG. 14B is a graph showing the angular velocity determined by the sensor 21 in accordance with the third embodiment of the present invention.

The angular velocity ω detected by the angular velocity sensor 21, as shown in FIG. 14B, is defined by equation (1) as $$\omega = \omega_0 \sin 2\pi ft \text{ (deg/sec)}, \qquad (1)$$

and the angle found by integrating the angular velocity, as shown in FIG. 14A, is defined by equation (2) as $$\theta = -\theta_0 \cos 2\pi ft \text{ (deg)}. \qquad (2)$$

As shown in FIGS. 14A and 14B, when the angular velocity becomes 0 (times t=0, t2, t4, t6), the angle found by integrating the angular velocity becomes a maximum or a minimum.

FIG. 15A is a graph which shows an example of the phase delay caused by the circuitry through which the output for the angular velocity sensor 21 is passed. As seen in FIG. 15A, a waveform a shows the angular velocity output from the angular velocity sensor 21. A waveform b shows and output of the angular velocity sensor 21 when delayed by a time td due to the amplifier 22, noise cutoff filter 23, and the like.

The angular velocity ω detected by the angular velocity sensor 21 and input to the amplifier 22 is defined by equation (1) as $$\omega = \omega_0 \sin 2\pi ft \text{ (deg/sec)}. \qquad (1)$$

When the angular velocity ω is delayed by a time td(ms) by the amplifier 22, noise cutoff filter 23 and the like, the delayed angular velocity ω is defined by equation (3) as $$\omega = \omega_0 \sin 2\pi f(t-td) \text{ (deg/sec)}. \qquad (3)$$

The value obtained by subtracting equation (1) from equation (3) is the angular velocity at time t delayed by the time td due to the delay caused by the amplifier 22, noise cutoff filter 23 and the like. The angular velocity used for performing vibration correction is shown in FIG. 15B, and is represented by equation (4) as $$\omega = -\omega_1 \cos 2\pi f(t-td/2) \text{ (deg/sec)}. \qquad (4)$$

By integrating equation (4) at time t, the angle of vibration delayed by a time td(ms) is as shown in the graph of FIG. 15C, and is represented by equation (5) as $$\theta = -\theta_1 \sin 2\pi f(t-td/2) \text{ (deg)}. \qquad (5)$$

The change of the angle of vibration and the movement of the image in the image plane are in proportion. For example, if the angle of vibration is doubled, the amount of movement of the image in the image plane is doubled. Therefore, when the angular velocity detected by the angular velocity sensor 21 is delayed by td(ms) due to the amplifier circuit 22, filter 23, and the like, the image vibration correction by the vibration correction lens system 25 is also delayed by a time td(ms).

Accordingly, the difference between the vibrational displacement of the image in the image plane and the vibrational displacement of the image in the image plane delayed by a time td(ms) when a correction is performed is as shown in the graph of FIG. 15D, and is represented by equation (6) as $$l = l_0 \sin 2\pi f(t-td/2). \qquad (6)$$

When performing correction for vibration caused, e.g., by a hand tremor, with this value of hand tremor arising, when the correction of hand tremor is delayed by a time td(ms), it is equivalent to a phenomenon of hand tremor remaining in the image plane.

Figure 16A:
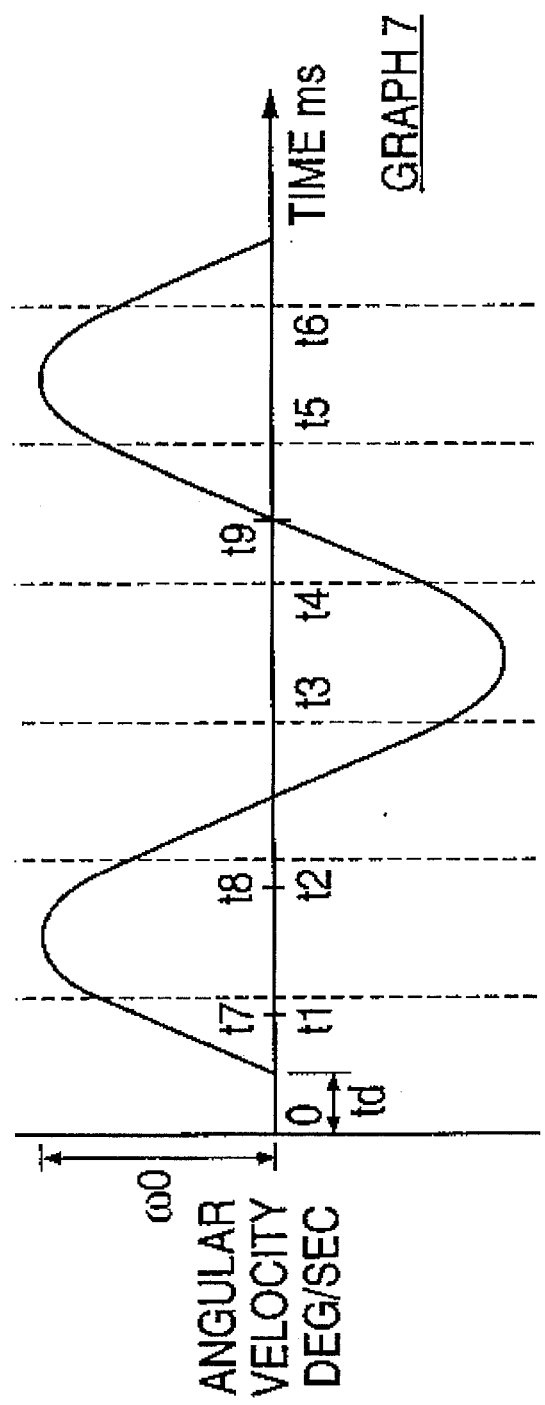
FIGS. 16A and 16B are graphs showing examples of the angular velocity when phase delay has occurred in the angular velocity detected by the angular velocity sensor, and the vibrational displacement of an image when vibration correction is performed with a delay in correction caused by a detection circuit, respectively, in accordance with the third embodiment of the present invention.
Figure 16B:
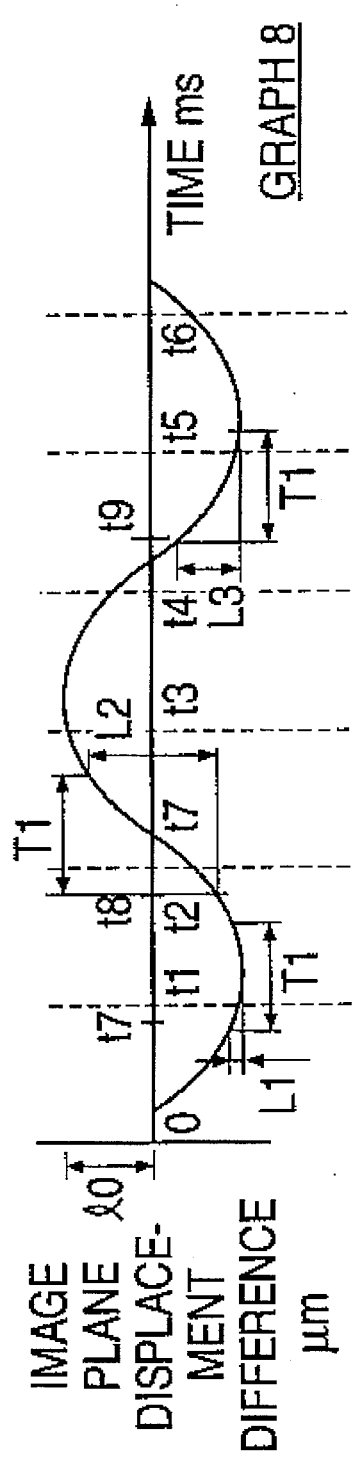

FIG. 16A is a graph showing the angular velocity detected by angular velocity sensor 21 delayed by a time td(ms). FIG. 16B is a graph showing the difference between the vibrational displacement of the image in the image plane due to the vibration, and the vibrational displacement of the image in the image plane delayed by the time td(ms) when performing vibration correction.

As seen in FIG. 16B, at an arbitrary time t7, the action of opening and closing the shutter 32 is commenced by the operation of the release button. When the shutter time is T1(ms), an amount L1(μm) of image vibration remains in the photographed picture. However, when at an arbitrary time t8, the opening and closing of the shutter 32 is commenced by operation of the release button, an amount L2(μm) of image vibration remains in the photographed picture. In particular, when there is a delay caused by the amplifier 22, cut-off filter 23 and the like through which the output of the angular velocity sensor 21 passes, differences in the timing of release give rise to differences in the amount of residual vibration in the image plane, even if the correction of vibration is performed. Consequently, when the opening and closing of the shutter 32 for a shutter time of T1(msec) is commenced by a release operation at a time t9 when the angular velocity becomes "0," as shown in FIG. 16B, an amount L3(μm) of image vibration remains in the photographed picture.

The residual vibration L3 in the picture taken at time t9 is a large value in comparison with the residual vibration L1 in the picture taken when the opening and closing of the shutter 32 was commenced at time t7. However, the residual vibration L3 becomes a constant amount without relation to the timing of the release.

Figure 17:
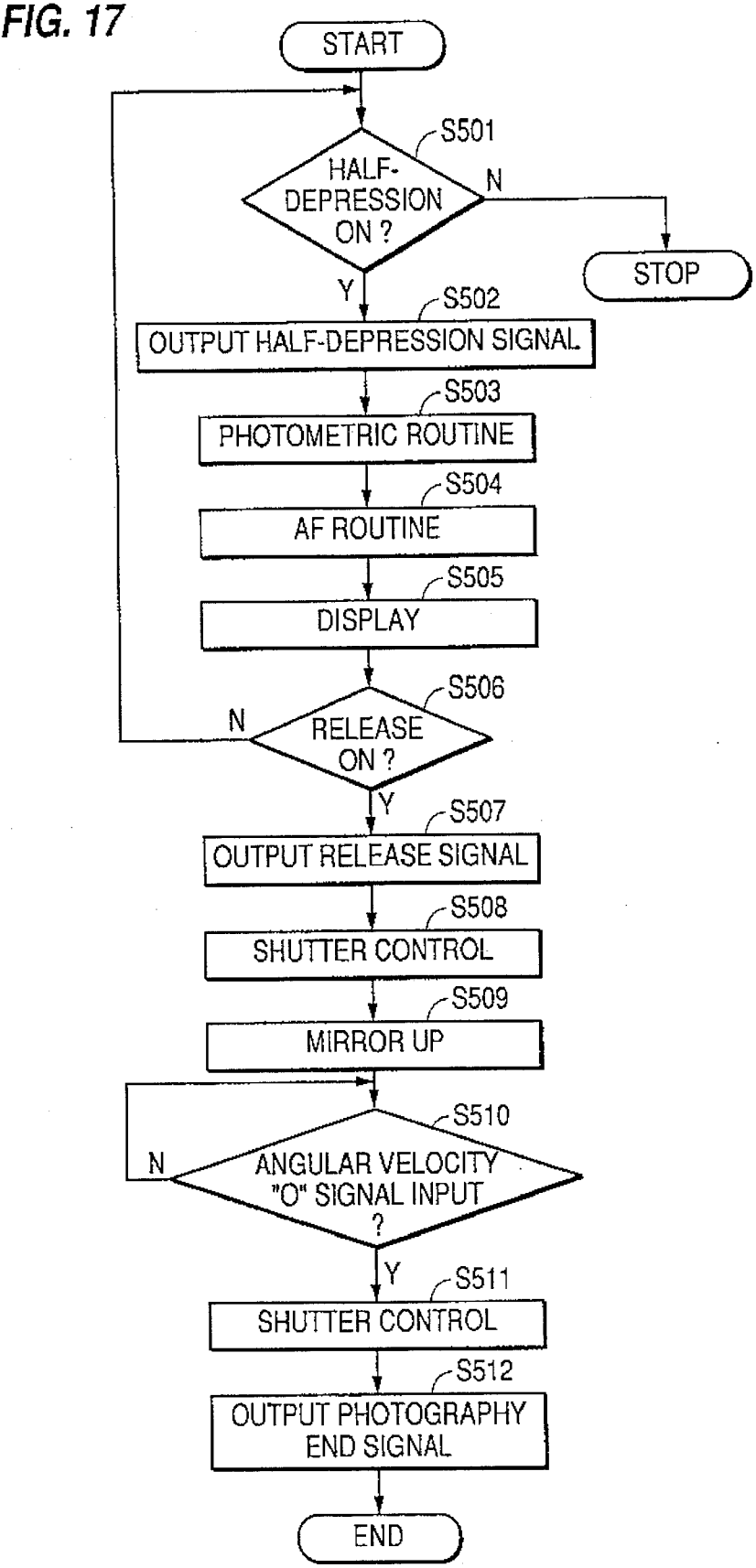
FIG. 17 is a flow chart showing an example of a control routine executed by the camera CPU in accordance with the third embodiment of the present invention.

FIG. 17 is a flow chart showing an example of a control routine executed by the camera CPU 10 to perform vibration correction in accordance with the third embodiment of the present invention.

Beginning in step S501, the release button on the camera body is half-depressed and it is determined whether the photometer and rangefinder switch 11a is ON. If the photometer and rangefinder switch 11a is OFF, the control routine ends immediately. However, when the photometer and rangefinder switch 11a is ON, the control routine proceeds to step S502, and a half-depression signal is output to the lens CPU 20 to indicate that the photometer and rangefinder switch 11a is ON, and that the camera has entered the half-depression operation state.

Next, in step S503, a photometric routine is performed during which photometric information relating to subject brightness is introduced to the camera CPU 10 from the photometric element 18 via A/D converter 19, and a stop value and shutter speed are determined in order to obtain a suitable exposure. Continuing in step S504, an autofocus (AF) routine is entered, rangefinding information is introduced, and focusing is performed. Proceeding to step S505, the shutter speed and stop value determined in step S503 are displayed on display 13.

In step S506, it is determined whether or not the release button is fully depressed and the release switch 11b is ON. When the determination in step S506 is negative, and the release switch 11b is OFF, the control routine returns to step S501 and the sequence in steps S501 through S505 is repeated until the photometer and rangefinder switch 11a is OFF. However, if the determination in step S506 is affirmative, and the release switch 11b is ON, the control routine proceeds to step S507 and a release signal is output to the lens CPU 20 indicating that the release switch 11b has been set ON. Next, in step S508, the stop 34 is stopped down by the stop control circuit 35 to the stop value determined in step S503. Proceeding to step S509, the mirror is raised.

In step S510, the control routine waits until the camera CPU 10 receives a signal from the lens CPU 20 indicating that a "0" angular velocity is detected by the angular velocity sensor 21. When an angular velocity "0" signal is received by the camera CPU 10 from the lens CPU 20, the control routine proceeds to step S511 and transit drive control of the front blind and rear blind of the shutter 32 is performed via the shutter control circuit 33 based upon the shutter speed determined in step S503. Control then proceeds to step S512, and after exposure control by the action of opening and closing the shutter 32, a correction end signal is output by the camera CPU 10 in order to indicate the end of the photographic exposure action.

Figure 18:
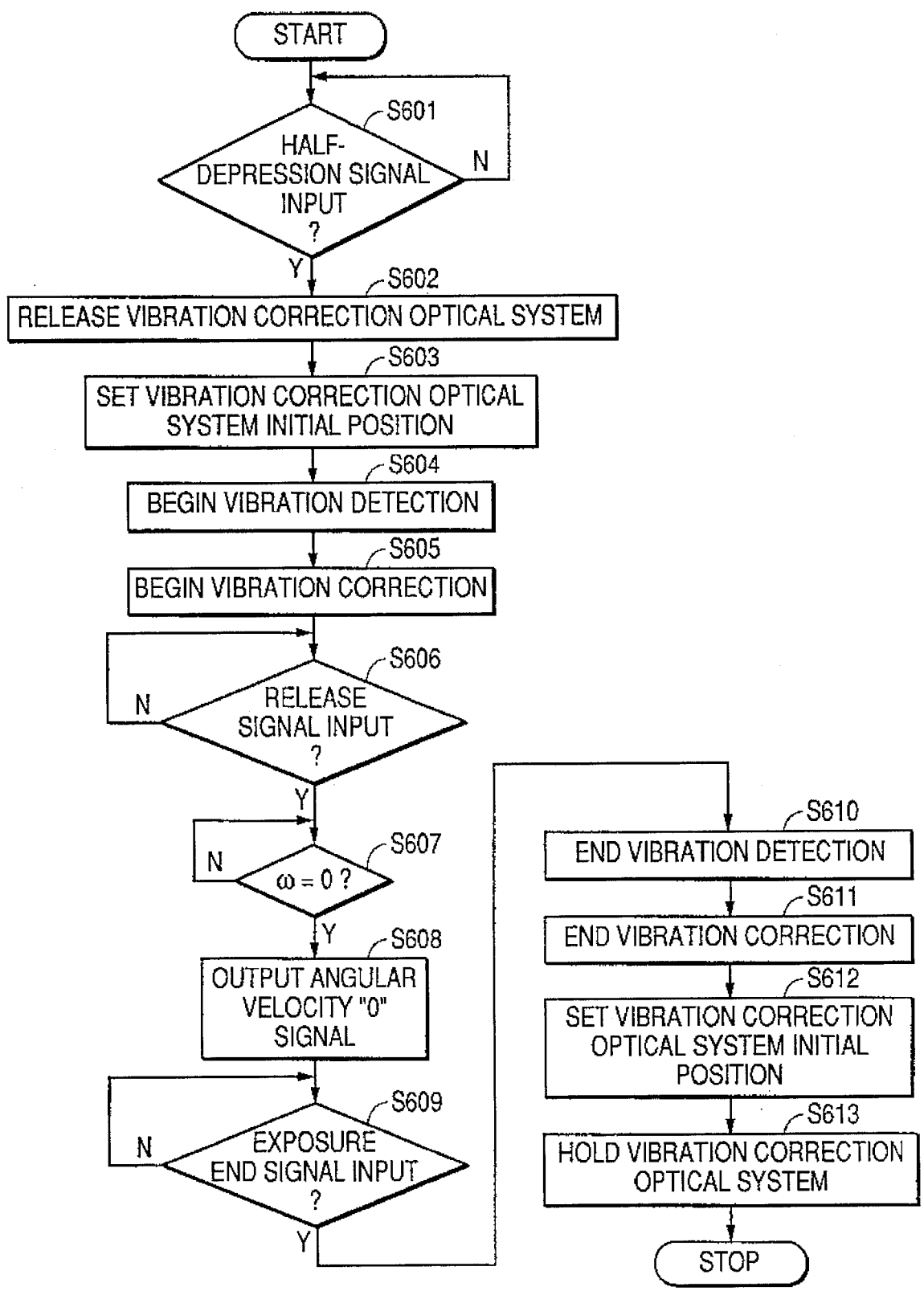
FIG. 18 is a flow chart showing an example of a control routine executed by the lens CPU in accordance with the third embodiment of the present invention.

FIG. 18 is a flow chart showing an example of a control routine executed by the lens CPU 20 for performing a vibration correction function in accordance with the third embodiment of the present invention.

Beginning in step S601, the control routine waits until the lens CPU 20 receives a release button half-depression signal from the camera CPU 10. When the half-depression signal has been received by the lens CPU 20 from the camera CPU 10, the control routine proceeds to step S602, and the vibration correction optical system of the vibration correction lens system 25 is released. Continuing in step S603, the vibration correction optical system of the vibration correction lens system 25 is set to an initial position. In step S604, detection of the vibration angular velocity by the vibration detection sensor 21 is commenced. Next, in step S605, the vibration correction lens system 25 is driven by the motor 26 via the driver 27 from its initial position based upon the result of the detection by vibration angular velocity in step S604, thereby commencing vibration correction. In step S606, the control routine waits until a release signal has been received from the camera CPU 10. When it is detected that the release signal has been received from the camera CPU 10 in step S606, the control routine proceeds to step S607, and waits for an input from the angular velocity sensor 21 indicating that the angular velocity co is "0." When the angular velocity ω "0" signal is received in step S607, in step S608 an angular velocity "0" signal is output to the camera CPU 10

Next, in step S609, the control routine waits until the lens CPU 20 receives an exposure end signal from the camera CPU 10. When the exposure end signal has been received in step S609 from the camera CPU 10, the control routine proceeds to step S610 and detection of the amount of vibration by the angular velocity sensor 21 is ended. In step S611 the vibration correction action is ended. Continuing in step S612, the vibration correction optical system of the vibration correction lens system 25 is set to an initial position. Proceeding to step S613, the vibration correction optical system of the vibration correction lens system 25 is held at the initial position set in step S612, and the control routine ends.

Therefore, a camera having the vibration correction system, as described in accordance with the third embodiment of the present invention, controls the exposure action of the camera in order that vibration correction is reliably performed. Specifically, when a phase delay arises between the angular velocity detected by the angular velocity sensor 21 and signals from the angular velocity sensor 21, after passing through amplifier 22 and filter 23, and an error results between the actual vibration and the vibration correction of the vibration correction lens system 25, exposure is performed when the angular velocity signal is "0" such that the error between the actual vibration and the vibration correction of the vibration correction lens system 25 is minimized. It is therefore possible to make the amount of residual vibration in the photographed picture small and the vibration correction device operates with greater efficiency.

Although the third embodiment of the present invention has been described with respect to specific components for the vibration correction system, it will be recognized that the third embodiment is not limited to those specific components. For example, although the third embodiment has been described with respect to angular velocity sensors to detect the vibration of the camera, it will be recognized that other kinds of vibration detection sensors may be used. Further, it will be recognized that other types of drive mechanisms and drive control mechanisms and the like may be employed in accordance with the third embodiment of the present invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vibration correction system for use in a camera to correct for vibration of an image formed on an image plane, comprising:

a vibration detection device to detect vibration of the camera and to output a signal representative of the detected camera vibration;

a vibration correction lens system to correct vibration of an image on the image plane;

a drive system to drive the vibration correction lens system to correct image vibration according to the signal representative of the detected vibration; and a control unit to determine whether an anomaly occurs in the vibration detection device and to inhibit the drive of the vibration correction lens system by the drive system in response to a determination that an anomaly occurs in the vibration detection device.

2. The vibration correction system, as recited in claim 1, wherein the vibration detection device includes a vibration sensor and the control unit determines whether an anomaly occurs in the vibration sensor.

3. The vibration correction system, as recited in claim 1, wherein the control unit determines that an anomaly occurs in the vibration sensor and modifies the drive action of the drive system to drive the vibration correction lens system.

4. A vibration correction system in a camera to correct for vibration of an image formed on an image plane, comprising:

a vibration sensor to detect vibration of the camera and to output a signal representing the detected vibration;

a vibration correction lens system to correct for vibration of an image in an image plane according to the signal representing the camera vibration; and a control unit to receive the signal output by the vibration sensor, to determine whether an anomaly occurs in the output signal of the vibration sensor and to inhibit operation of the vibration correction lens system in response to a determination that an anomaly occurs in the output signal of the vibration sensor.

5. A vibration correction system in a camera, comprising:

a vibration correction lens system to correct for vibration in the camera;

a vibration correction drive to drive the vibration correction lens system;

a state detection unit to detect a state of operation of the vibration correction lens system and to output signals indicating the operation state; and a control unit to receive the signals output by the state detection unit, to determine whether an anomaly occurs in at least one of the vibration correction lens system and vibration correction drive based on the detected operation state, and to inhibit operation of the vibration correction lens system and vibration correction drive in response to a determination that an anomaly occurs in at least one of the vibration correction lens system and the vibration correction drive.

6. The vibration correction system, as recited in claim 5, wherein the state detection unit is an encode detecting a drive position of the vibration correction lens system.

7. A vibration correction system in a camera, comprising:

a vibration correction lens system to correct vibration of an image in an image plane caused by vibration of the camera;

a drive mechanism to drive the vibration correction lens system in a direction to correct the image vibration;

a shutter;

a drive state detection device to detect a drive direction of the vibration correction lens system; and a control unit to control the shutter such that the shutter is operated immediately after a drive direction of the vibration correction lens system detected by the drive state detection device has reversed during photography.

8. A vibration correction system in a camera, comprising:

a shutter;

a vibration detection device to detect vibration in the camera and to output a signal representing the detected vibration;

a vibration correction lens system to perform vibration correction according to the signal representing the detected vibration; and a control unit to determine an error occurring in the vibration correction due to a delay between actual image vibration and the output signal from the vibration detection device and to control timing of the shutter operation to minimize the vibration correction error.

9. The vibration correction system, as recited in claim 8, wherein the vibration detection device includes an amplifier and a noise filter and the delay is caused by the amplifier and the filter.

10. The vibration correction system, as recited in claim 8, wherein the vibration detection sensor is an angular velocity sensor detecting the angular velocity of vibration of the camera, and wherein the control unit controls the shutter operation to operate the shutter when the detected angular velocity is zero.

11. A vibration correction system in a camera to correct for vibration of an image formed on an image plane, comprising:

a vibration detection and correction device to detect vibration in the camera and to correct vibration of the image formed on the image plane according to the detected vibration; and a control unit to determine whether an anomaly occurs in the vibration detection and correction device and to modify camera operation in response to a determination that an anomaly occurs in the vibration detection and correction device.

12. A vibration correction system in a camera to correct for vibration of an image formed on an image plane, comprising:

a vibration detection device to detect vibration of the camera in a yaw direction and in a pitch direction and to output signals representative of the vibration detected in the yaw and pitch directions, respectively;

a vibration correction lens system to correct for vibration of an image on the image plane according to the signals representative of the detected vibration;

a drive system to drive the vibration correction lens system in a direction to correct image vibration; and a control unit to monitor the signals representative of the detected vibration in the yaw direction and in the pitch direction, respectively, and to inhibit the drive of the vibration correction lens system by the drive system when at least one of the outputs of the vibration detection device is a constant value.

13. A vibration correction system in a camera to correct for vibration of an image formed on an image plane, comprising:

a vibration detection device to detect vibration of the camera and to output a signal representative of the detected camera vibration;

a vibration correction lens system to correct for vibration of an image on the image plane;

a drive system to drive the vibration correction lens system to correct image vibration according to the signal representative of the detected vibration; and a control unit to determine whether an anomaly occurs in the vibration correction lens system and to inhibit drive of the vibration correction lens system by the drive system in response to a determination that an anomaly occurs in the vibration correction lens system.

14. A vibration correction system in a camera to correct for vibration of an image formed on an image plane, comprising:

a vibration detection device to detect vibration of the camera and to output a signal representative of the detected camera vibration;

a vibration correction lens system to correct for vibration of an image on the image plane according to the signal representative of the detected vibration;

a drive system to drive the vibration correction lens system in a direction to correct image vibration;

a speed detection device to detect a drive speed of the vibration correction lens system; and a control unit to inhibit the drive system when a maximum drive speed of the vibration correction lens system detected by the speed detection device is smaller than a predetermined value.

15. A camera, comprising:

a shutter;

a vibration detection device to detect vibration of the camera and to output a signal representative of the detected vibration;

a vibration correction lens system to correct for vibration of an image on an image plane;

a drive system to drive the vibration correction lens system to correct image vibration according to the signal representative of the detected vibration; and a control unit to control operation of the shutter when there are delays in the vibration detection device and drive system, such that an error due to the delays becomes a minimum.

16. A camera, comprising:

a shutter;

a vibration detection device to detect vibration of the camera and to output a signal representative of the detected vibration;

a vibration correction lens system to correct for vibration of an image on an image plane;

a drive system to drive the vibration correction lens system to correct image vibration according to the signal representative of the detected vibration; and a device to operate the shutter in response to a signal from the vibration in detection device indicating that a speed of vibration detected by the vibration detection device is zero.

17. A vibration correction system in a camera to correct for vibration of an image formed on an image plane, comprising:

a vibration detection and correction device to detect vibration in the camera and to correct vibration of the image formed on the image plane caused by vibration of the camera; and a control unit to determine an anomaly occurring in the vibration detection and correction device and to modify camera operation, wherein the vibration detection and correction device includes a mechanical drive mechanism and the anomaly determined by the control unit is chatter in the drive mechanism.

18. A vibration correction system in a camera to correct for vibration of an image formed on an image plane, comprising:

a vibration detection and correction device to detect vibration in the camera and to correct vibration of the image formed on the image plane caused by vibration of the camera; and a control unit to determine an anomaly occurring in the vibration detection and correction device and to modify camera operation, wherein the vibration detection and correction device includes a vibration sensor to detect the camera vibration and the anomaly determined by the control unit is a delay in the output of the vibration sensor with respect to the image vibration.

19. A vibration correction system in a camera to correct for vibration of an image formed on an image plane, comprising:

a vibration detection device to detect vibration of the camera and to output a signal representative of the detected camera vibration;

a vibration correction lens system to correct for vibration of an image on the image plane;

a drive system to drive the vibration correction lens system in a direction to correct image vibration according to the signal representative of the detected vibration; and a control unit to determine an anomaly occurring in the vibration correction lens system and to inhibit drive of the vibration correction lens system, wherein an anomaly is detected in the vibration correction lens system and the control unit modifies the drive action of the vibration correction lens system.

* * * * *

UNITED STATES PATENT AND TRADEMARK OFFICE
CERTIFICATE OF CORRECTION

PATENT NO. : 5,585,875
DATED :
INVENTOR(S) : December 17, 1996
Kazuharu IMAFUJI et al.

It is certified that error appears in the above-indentified patent and that said Letters Patent is hereby corrected as shown below:

Column 18, claim 6, line 9, change "encode" to --encoder--.

Signed and Sealed this

Twentieth Day of May, 1997

Attest:

BRUCE LEHMAN

*Attesting Officer*  *Commissioner of Patents and Trademarks*